(12) United States Patent
Koshimoto et al.

(10) Patent No.: US 10,578,064 B2
(45) Date of Patent: Mar. 3, 2020

(54) RELIEF VALVE DEVICE AND HIGH-PRESSURE PUMP

(71) Applicant: DENSO CORPORATION, Kariya, Aichi-pref. (JP)

(72) Inventors: Shinichiro Koshimoto, Kariya (JP); Yoshihito Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/269,590

(22) Filed: Feb. 7, 2019

(65) Prior Publication Data

US 2019/0170100 A1 Jun. 6, 2019

Related U.S. Application Data

(63) Continuation of application No. PCT/JP2017/029297, filed on Aug. 14, 2017.

(30) Foreign Application Priority Data

Aug. 26, 2016 (JP) .................................. 2016-165544

(51) Int. Cl.
*F02M 59/46* (2006.01)
*F16K 17/04* (2006.01)
(Continued)

(52) U.S. Cl.
CPC ............ *F02M 59/46* (2013.01); *F02M 59/36* (2013.01); *F02M 59/44* (2013.01); *F02M 69/54* (2013.01);
(Continued)

(58) Field of Classification Search
CPC ........ F02M 59/36; F02M 59/44; F02M 59/46; F02M 69/54; F16K 17/02; F16K 17/04; F16K 17/22
See application file for complete search history.

(56) References Cited

U.S. PATENT DOCUMENTS

2012/0288389 A1* 11/2012 Kuroyanagi ....... F02M 63/0077
417/559
2016/0076504 A1* 3/2016 Anandhan .......... F02M 37/0023
123/456
(Continued)

FOREIGN PATENT DOCUMENTS

| JP | 54-30124 | 2/1979 |
|---|---|---|
| JP | 2-132847 | 11/1990 |
| JP | 2004-197834 | 7/2004 |

*Primary Examiner* — Erick R Solis
(74) *Attorney, Agent, or Firm* — Nixon & Vanderhye PC

(57) ABSTRACT

A relief valve device includes: a valve housing that includes a communication passage, which communicates between a first pressure chamber and a second pressure chamber, and a relief chamber, which is configured to communicate with the second pressure chamber; a partition wall that is formed in an inside of the valve housing and partitions between the communication passage and the relief chamber; a first valve member that is configured to block and enable flow of fluid between the first pressure chamber and the communication passage; a first urging member that urges the first valve member; a second valve member that is configured to block and enable flow of the fluid between the second pressure chamber and the relief chamber; and a second urging member that urges the second valve member.

13 Claims, 11 Drawing Sheets

(51) Int. Cl.
  *F02M 69/54*   (2006.01)
  *F02M 59/44*   (2006.01)
  *F02M 59/36*   (2006.01)
  *F16K 17/22*   (2006.01)
  *F16K 24/02*   (2006.01)

(52) U.S. Cl.
  CPC .............. *F16K 17/04* (2013.01); *F16K 17/22* (2013.01); *F16K 24/02* (2013.01)

(56) References Cited

U.S. PATENT DOCUMENTS

| | | | |
|---|---|---|---|
| 2018/0135580 A1* | 5/2018 | Koga | F02M 59/46 |
| 2018/0238287 A1* | 8/2018 | Tokuo | F02M 59/466 |
| 2019/0128229 A1* | 5/2019 | Hashida | F02M 59/36 |
| 2019/0162328 A1* | 5/2019 | Gilbert | F16K 31/365 |
| 2019/0211788 A1* | 7/2019 | Kodama | F02M 59/34 |
| 2019/0309715 A1* | 10/2019 | Saso | F02M 59/46 |
| 2019/0323465 A1* | 10/2019 | Saito | F02M 59/36 |

* cited by examiner

RELIEF VALVE DEVICE AND HIGH-PRESSURE PUMP

CROSS REFERENCE TO RELATED APPLICATIONS

This application is a continuation application of International Patent Application No. PCT/JP2017/029297 filed on Aug. 14, 2017, which designated the U.S. and claims the benefit of priority from Japanese Patent Application No. 2016-165544 filed on Aug. 26, 2016. The entire disclosures of all of the above applications are incorporated herein by reference.

TECHNICAL FIELD

The present disclosure relates to a relief valve device and a high-pressure pump.

BACKGROUND

Previously, there is known a relief valve device that is configured to communicate between two spaces and execute valve opening when a pressure of fluid in one space among the two spaces becomes equal to or larger than a predetermined value to reduce the pressure of the one space.

SUMMARY

According to the present disclosure, there is provided a relief valve device that is configured to connect with a first pressure chamber and a second pressure chamber and is operable to reduce a pressure of fluid in the second pressure chamber. The relief valve device includes a valve housing, a partition wall, a first valve member and a second valve member. The valve housing includes: a communication passage, which communicates between the first pressure chamber and the second pressure chamber; and a relief chamber, which is configured to communicate with the second pressure chamber. The partition wall is formed in an inside of the valve housing and partitions between the communication passage and the relief chamber. The first valve member is configured to block and enable flow of fluid between the first pressure chamber and the communication passage. The second valve member is configured to block and enable flow of the fluid between the second pressure chamber and the relief chamber.

According to the present disclosure, there is also provided a high-pressure pump that includes the relief valve device.

BRIEF DESCRIPTION OF DRAWINGS

The present disclosure, together with additional objectives, features and advantages thereof, will be best understood from the following description in view of the accompanying drawings.

DETAILED DESCRIPTION

Figure 1:
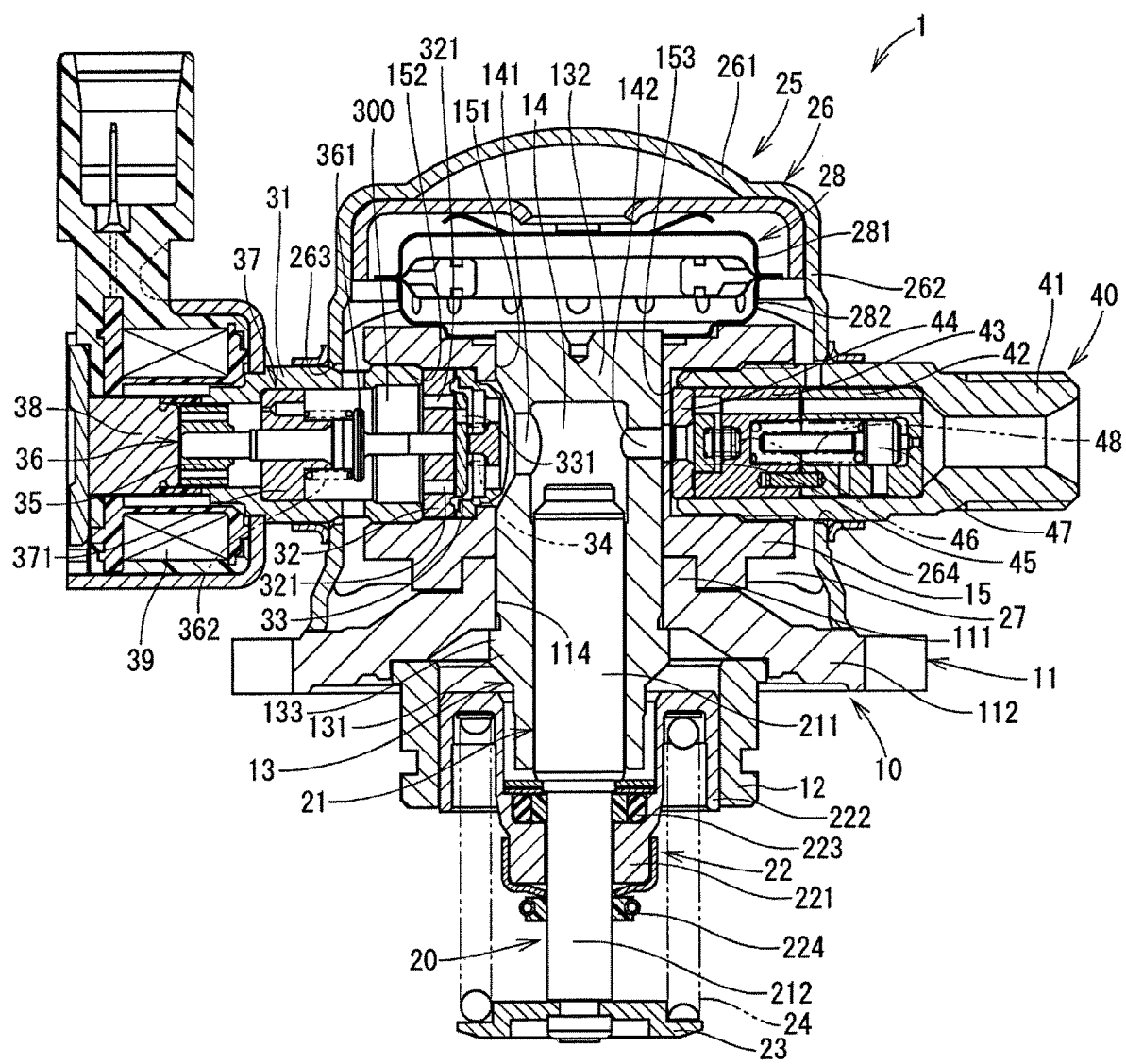
FIG. 1 is a cross-sectional view of a high-pressure pump according to a first embodiment of the present disclosure.
Figure 2:
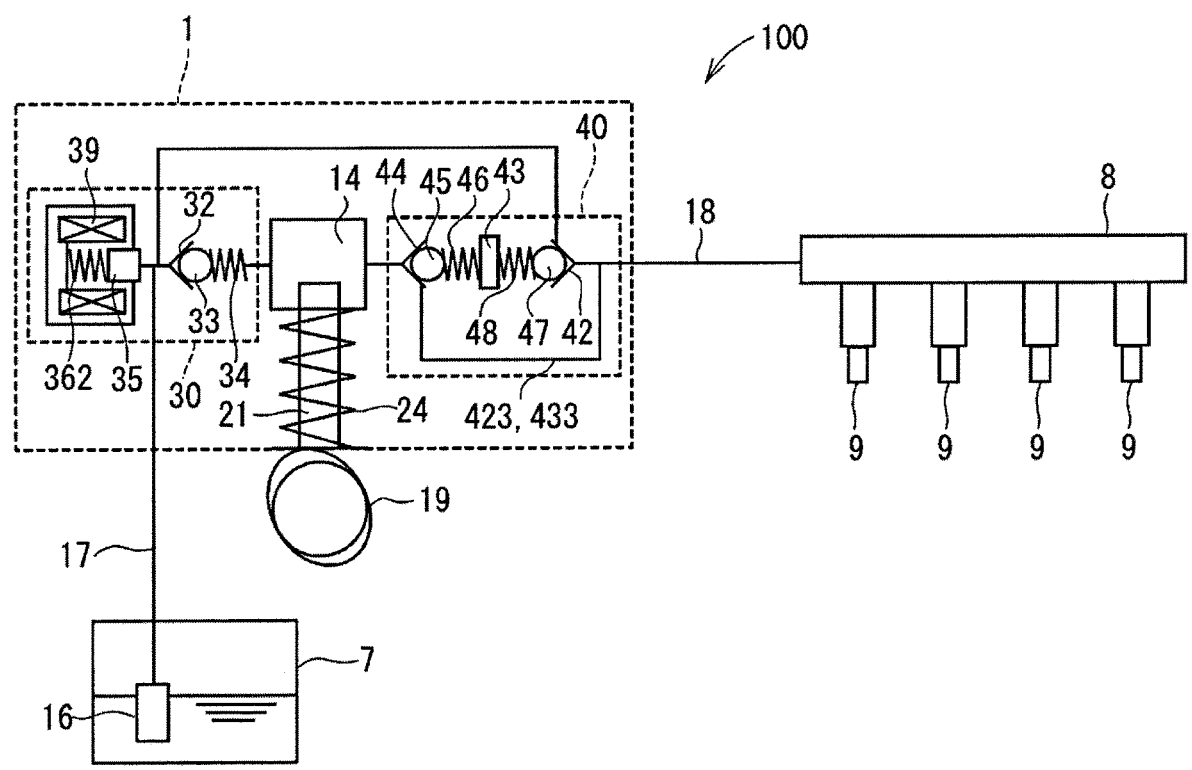
FIG. 2 is a schematic diagram of a fuel supply system, in which the high-pressure pump according to the first embodiment of the present disclosure is applied.

Previously, there is known a relief valve device that is configured to communicate between two spaces and execute valve opening when a pressure of fluid in one space among the two spaces becomes equal to or larger than a predetermined value to reduce the pressure of the one space. The relief valve device includes: a valve body; a valve member that is reciprocatably received in the valve body and blocks or enables flow of fluid from the other space to the one space; a first urging member that urges the valve member in a valve closing direction thereof; a relief valve member that is opened when a pressure of the fluid in an inside of the valve body, which is communicated with the one space, becomes equal to or larger than a predetermined value; and a second urging member that urges the relief valve member in a valve closing direction thereof.

In this relief valve device, an opposite end part of the first urging member, which is opposite from an end part of the first urging member that is in contact with the valve member, is supported by a member that is different from a member that supports an opposite end part of the second urging member, which is opposite from an end part of the second urging member that is in contact with the relief valve member. Therefore, a volume, which is measured in a direction that is substantially parallel with a moving direction of the valve member, becomes relatively large. In a case where the relief valve device described above is applied to a high-pressure pump for supplying fuel to a fuel injection valve configured to inject the fuel into a combustion chamber of an internal combustion engine, a relief pressure of the relief valve device needs to be higher than a fuel injection pressure of the fuel injection valve. Therefore, an urging force of the urging member, which urges the relief valve member in the valve closing direction, needs to be relatively large. However, since the space, which receives the second urging member, is relatively small, the spring load cannot be made large. Furthermore, when the spring load is increased, a size, which is measured in a direction that is substantially parallel to a moving direction of the relief valve member, is further increased.

A relief valve device according to a first aspect of the present disclosure is configured to connect with a first pressure chamber and a second pressure chamber, which are formed as different spaces, while the relief valve device is operable to reduce a pressure of fluid in the second pressure chamber. The relief valve device includes a valve housing, a partition wall, a first valve member, a first urging member, a second valve member and a second urging member.

The valve housing includes: a communication passage, which communicates between the first pressure chamber and the second pressure chamber; and a relief chamber, which is configured to communicate with the second pressure chamber.

The partition wall is formed in an inside of the valve housing and partitions between the communication passage and the relief chamber.

The first valve member is configured to block and enable flow of fluid between the first pressure chamber and the communication passage.

The first urging member has one end, which contacts the first valve member, and another end, which contacts the partition wall. The first urging member urges the first valve member in an opposite direction that is opposite from the partition wall.

The second valve member is configured to block and enable flow of the fluid between the second pressure chamber and the relief chamber.

The second urging member has one end, which contacts the second valve member, and another end, which contacts a wall surface of the partition wall located on the relief chamber side. The second urging member urges the second valve member in a direction for contacting the second valve member against the relief valve seat.

In the relief valve device of the present disclosure, the first urging member and the second urging member contact the partition wall. Therefore, in the relief valve device of the present disclosure, since the member, which supports the end part of the first urging member, and the member, which supports the end part of the second urging member, can be formed as the common member, a size of the relief valve device can be made relatively compact. Furthermore, since the member, which supports the end part of the first urging member, and the member, which supports the end part of the second urging member, can be formed as the common member, it is possible to limit an increase in the size of the relieve valve device even when the size of the relief chamber, which receives the second urging member, is made relatively large in the case where the urging force of the second urging member is increased. Accordingly, the relief pressure of the relief valve device can be set to be high while implementing the compact size of the relief valve device.

Hereinafter, various embodiments will be described with reference to the drawings. In the following embodiments, substantially identical constituent parts are indicated by the same reference signs and will not be redundantly described for the sake of simplicity.

FIRST EMBODIMENT

FIGS. 1 to 6 show a relief valve device and a high-pressure pump according to a first embodiment. A fuel discharge relief device 40, which serves as the relief valve device, according to the first embodiment is applied to the high-pressure pump 1. The high-pressure pump 1 is applied to a fuel supply system 100 shown in FIG. 2.

First of all, a structure of the fuel supply system 100 will be described. The fuel supply system 100 is a system that supplies fuel to, for example, a combustion chamber of an internal combustion engine (not shown) of a vehicle. The fuel supply system 100 includes a fuel tank 7, a low pressure pump 16, a high-pressure pump 1, a fuel rail 8 (serving as a second pressure chamber), and fuel injection valves 9.

The fuel (serving as fluid), which is stored in the fuel tank 7, is pressurized to a certain extent by the low pressure pump 16 and is then supplied to the high-pressure pump 1 through a fuel supply passage 17. The high-pressure pump 1 pressurizes the fuel received from the low pressure pump 16 to a pressure, at which the fuel can be injected from the fuel injection valve 9, and thereafter the high-pressure pump 1 supplies the pressurized fuel to the fuel rail 8 through a fuel supply passage 18. The high pressure fuel, which is stored in the fuel rail 8, is injected into a combustion chamber or an intake pipe of the internal combustion engine (not shown) according to the operation of the fuel injection valve 9.

The high-pressure pump 1 includes a main body 10 (serving as a pump housing), a plunger arrangement 20, a fuel storage portion 25, a fuel suction device 30 (serving as a suction valve) and a fuel discharge relief device 40. In the following description, an upper side of FIG. 1 is defined as an upper side, and a lower side of FIG. 1 is defined as a lower side.

The main body 10 includes a lower housing 11, an engine fitting portion 12, a cylinder 13 and an upper housing 15.

The lower housing 11 includes: a cylinder holding portion 111, which is shaped into a cylindrical tubular form; and a flange portion 112, which is formed to project from one end part of the cylinder holding portion 111 in a radially outward direction. The cylinder holding portion 111 includes a receiving hole 114, through which the cylinder 13 is inserted.

The engine fitting portion 12 is a cylindrical tubular member that is placed at a side of the flange portion 112, which is opposite from the cylinder holding portion 111. The engine fitting portion 12 can be fitted to the internal combustion engine to place the high-pressure pump 1 at a predetermined location of the internal combustion engine.

The cylinder 13 is shaped into a tubular form having a bottom and includes a tubular portion 131 and a bottom portion 132. The cylinder 13 is inserted into the lower housing 11 and is securely press fitted into the upper housing 15.

The tubular portion 131 slidably supports the plunger 21 at an inside of the tubular portion 131. The tubular portion 131 includes a projection 133, which is formed at a radially outer wall of the tubular portion 131 and is engageable to the cylinder holding portion 111. The projection 133 limits movement of the cylinder 13.

The bottom portion 132 is formed to close one end part of the tubular portion 131 and defines a pressurizing chamber 14 (serving as a first pressure chamber) in corporation with the tubular portion 131 and the plunger 21. A volume of the pressurizing chamber 14 changes in response to reciprocation of the plunger 21. The pressurizing chamber 14 is communicated with a suction hole 141 and a discharge hole 142 of the tubular portion 131.

The upper housing 15 is shaped into a rectangular parallelepiped form that is elongated in a connecting direction for connecting the suction hole 141 to the discharge hole 142. The upper housing 15 is placed on an opposite side of the lower housing 11, which is opposite from the engine fitting portion 12. The upper housing 15 includes a press fitting hole 151, a suction passage 152 and a discharge passage 153. The press fitting hole 151 is formed at a center of the upper housing 15, which is centered in a longitudinal direction of the upper housing 15, and the cylinder 13 is insertable through the press fitting hole 151. In this way, the cylinder 13 is supported by the upper housing 15. The suction passage 152 is communicated with the suction hole 141. The fuel suction device 30 is placed in the suction passage 152, and the fuel to be drawn into the pressurizing chamber 14 can pass through the suction passage 152. The discharge passage 153 is communicated with the discharge hole 142.

The fuel discharge relief device 40 is placed in the discharge passage 153, and the fuel discharged from the pressurizing chamber 14 can pass through the discharge passage 153.

The plunger arrangement 20 includes a plunger 21, an oil seal holder 22, a spring seat 23 and a plunger spring 24. The plunger arrangement 20 can pressurize the fuel in the pressurizing chamber 14.

The plunger 21 includes: a large diameter portion 211, which is slidable along an inner wall of the tubular portion 131; and a small diameter portion 212, which extends from the large diameter portion 211 in an opposite direction that is opposite from the pressurizing chamber 14. The small diameter portion 212 is configured such that an outer surface of the small diameter portion 212 is contactable to a cam 19 (see FIG. 2) installed to a camshaft (not shown). Thereby, the small diameter portion 212 is reciprocated in an axial direction according to a configuration of the rotating cam 19.

The oil seal holder 22 is placed on a side of the small diameter portion 212 in a radially outward direction. The oil seal holder 22 includes: a seal holding portion 221, which is configured into a tubular form such that the small diameter portion 212 of the plunger 21 is insertable into the seal holding portion 221; and a fixing portion 222, which is fixed to a radially inner side of the engine fitting portion 12.

The seal holding portion 221 holds a seal 223. The seal 223 includes: a Teflon (registered trademark) ring, which is placed at a radially inner side; and an O-ring, which is placed at a radially outer side. The seal 223 adjusts a thickness of a fuel oil film around the small diameter portion 212. An oil seal 224 is fixed to a lower end part of the seal holding portion 221. The oil seal 224 adjusts the thickness of the oil film around the small diameter portion 212.

The spring seat 23 is fixed to a lower end part of the plunger 21.

One end of the plunger spring 24 is engaged to the spring seat 23, and another end of the plunger spring 24 is engaged to the fixing portion 222. The plunger spring 24 urges the plunger 21 such that the plunger 21 contacts a tappet. In the plunger arrangement 20, the plunger 21 is reciprocated in response to the rotation of the camshaft, so that the volume of the pressurizing chamber 14 is changed.

The fuel storage portion 25 includes a cover 26, a pulsation damper 28, a fuel inlet (not shown), and a fuel filter (not shown). The fuel storage portion 25 temporarily stores the fuel to be supplied to the fuel suction device 30.

The cover 26 is a tubular member having a bottom and receives the upper housing 15 and an upper portion of the cylinder 13. The cover 26 includes a cover bottom portion 261 and a cover tubular portion 262.

The cover bottom portion 261 closes an upper opening of the cover tubular portion 262.

A lower end part of the cover tubular portion 262 contacts an upper end surface of the flange portion 112. The cover tubular portion 262 includes a plurality of fitting holes. A fitting hole 263, which is one of the plurality of fitting holes, is formed at a location that corresponds to the suction passage 152. The fuel suction device 30 is inserted into the fitting hole 263. A fitting hole 264, which is another one of the plurality of fitting holes, is formed at a location that corresponds to the discharge passage 153. The fuel discharge relief device 40 is inserted into the fitting hole 264. A fuel inlet (not shown), through which the fuel can be supplied from an outside to a fuel gallery 27 (serving as a fluid storage chamber) defined by the cover 26 and the flange portion 112, is inserted into another one (not shown) of the plurality of fitting holes, which is different from the fitting holes 263, 264.

The cover 26 is joined to the flange portion 112 by welding. The fuel suction device 30, the fuel discharge relief device 40 and the fuel inlet are joined to the cover 26 by welding. By the above-described welding, the fuel gallery 27 maintains liquid tightness.

The pulsation damper 28 is placed in the fuel gallery 27. The pulsation damper 28 is formed by two diaphragms 281, 282, which are respectively shaped into a circular dish form and are joined together along an outer peripheral edge part thereof, and gas having a predetermined pressure is sealed in an inside of the pulsation damper 28. The outer peripheral edge part of the diaphragms 281, 282 of the pulsation damper 28 is fixed to an inner wall of the cover 26. The pulsation damper 28 is resiliently deformed in response to a pressure change of the fuel in the fuel gallery 27 to damp pressure pulsation of the fuel in the fuel gallery 27.

The fuel suction device 30 includes a suction valve body 31, a valve seat 32, a suction valve member 33, a coil spring 34, a movable core 35, a needle 36, a needle guide 37, a stationary core 38 and a coil 39. The fuel suction device 30 is a normally open type electromagnetic valve.

The suction valve body 31 is shaped into a tubular form and is fixed to the suction passage 152 of the upper housing 15. The suction valve body 31 includes a suction chamber 300 that is configured to enable communication of the suction chamber 300 relative to the fuel gallery 27 and the pressurizing chamber 14.

The valve seat 32 is a substantially circular plate member and is placed on the pressurizing chamber side of the suction valve body 31. The valve seat 32 includes a plurality of through holes 321 that are configured to enable communication between the suction chamber 300 and the pressurizing chamber 14 through the through holes 321.

The suction valve member 33 is placed on the pressurizing chamber side of the valve seat 32 in a manner that enables reciprocation of the suction valve member 33. The suction valve member 33 is urged by the coil spring 34 placed on the pressurizing chamber side of the suction valve member 33, so that the suction valve member 33 contacts the valve seat 32. The suction valve member 33 includes a communication passage 331 that communicates between a space, which is located on the pressurizing chamber side of the suction valve member 33, and a space, which is located on the suction chamber side of the suction valve member 33.

The movable core 35 is shaped into a cylindrical tubular form. The movable core 35 is movable in an axial direction at an inside of one end part of the suction valve body 31.

The needle 36 is supported by the needle guide 37 in a manner that enables reciprocation of the needle 36 in the inside of the suction valve body 31. The needle 36 is configured to enable reciprocation of the needle 36 integrally with the movable core 35. The needle 36 is inserted through the valve seat 32 and contacts an end surface of the suction valve member 33 located on a side that is opposite from the pressurizing chamber 14. The needle 36 includes a flange portion 361 that projects in a radially outward direction at a location that corresponds to an end part of the needle guide 37, which is opposite from the movable core 35.

The needle guide 37 includes a flange portion 371 that projects in a radially outward direction at an end part of the needle guide 37 located on the movable core 35 side. A spring 362 is held between the flange portion 361 of the needle 36 and the flange portion 371. The spring 362 urges the needle 36 toward the pressurizing chamber 14 by an urging force that is larger than an urging force of the coil spring 34, which urges the suction valve member 33.

The stationary core 38 is made of a magnetic material. The stationary core 38 is placed on an opposite side of the movable core 35, which is opposite from the suction valve member 33.

The coil 39 is placed on a radially outer side of the stationary core 38. When the electric power is supplied to the coil 39, the coil 39 forms a magnetic field.

At the fuel suction device 30, when the electric power is supplied to the coil 39, a magnetic attractive force is generated between the movable core 35 and the stationary core 38. When the magnetic attractive force between the movable core 35 and the stationary core 38 increases to some extent, the needle 36 is moved together with the movable core 35 toward the stationary core 38. In this way, an applied force of the needle 36, which is applied to the suction valve member 33, is reduced, and thereby the suction valve member 33 contacts the valve seat 32. When the suction valve member 33 contacts the valve seat 32, the communication between the suction chamber 300 and the pressurizing chamber 14 is blocked.

Furthermore, when the supply of the electric power to the coil 39 is stopped, a magnetic attractive force between the movable core 35 and the stationary core 38 is lost. When the magnetic attractive force is lost, the needle 36 is moved by the urging force of the spring 362 in an opposite direction that is opposite from the stationary core 38. In this way, the applied force of the needle 36, which is applied to the suction valve member 33, is increased, and thereby the suction valve member 33 is displaced away from the valve seat 32. When the suction valve member 33 is displaced away from the valve seat 32, the suction chamber 300 and the pressurizing chamber 14 are communicated with each other.

In the fuel suction device 30, the movement of the needle 36 is controlled in the above described manner to control the position of the suction valve member 33 relative to the valve seat 32.

Figure 3:
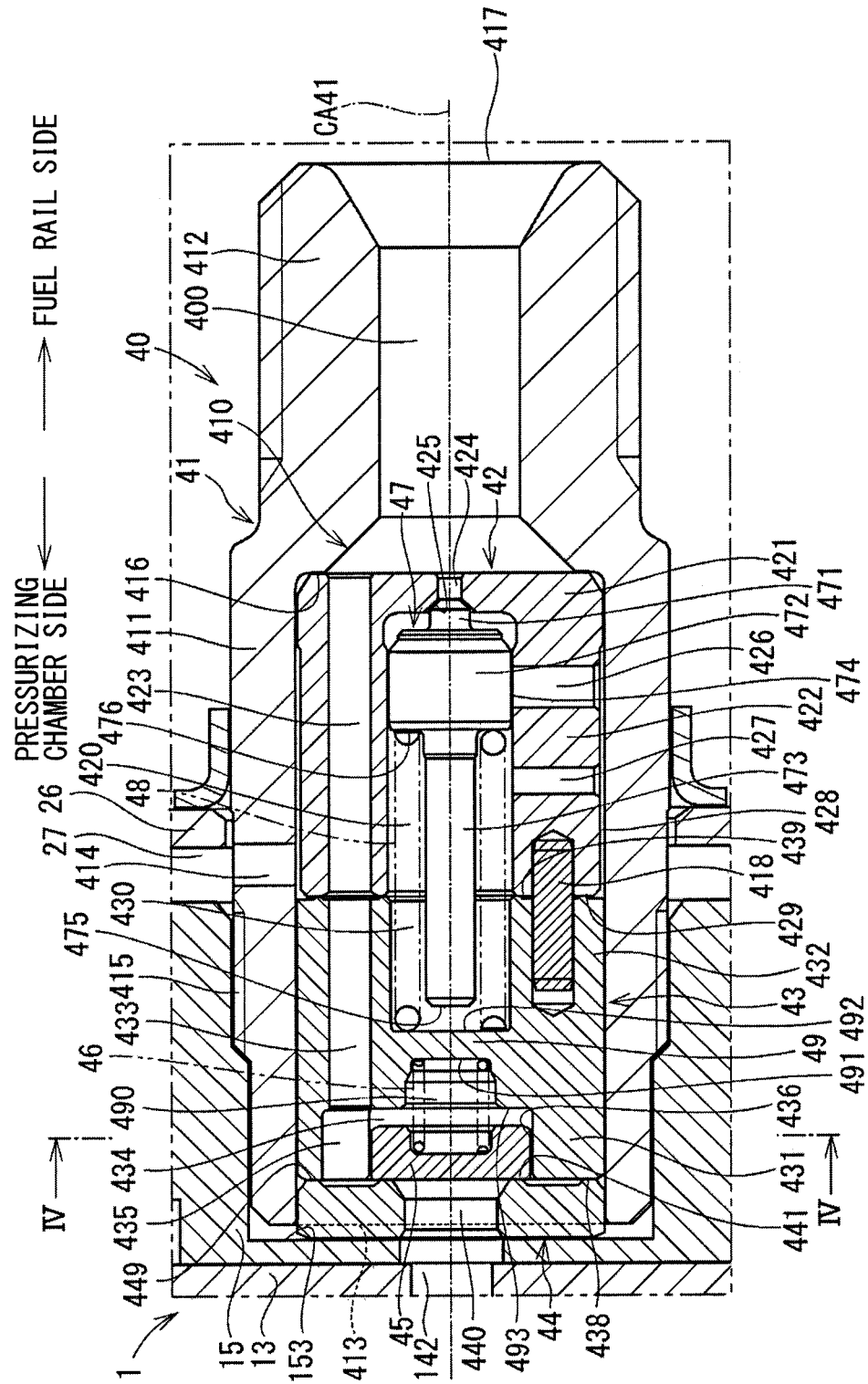
FIG. 3 is a cross-sectional view of a relief valve device according the first embodiment of the present disclosure.
Figure 5:
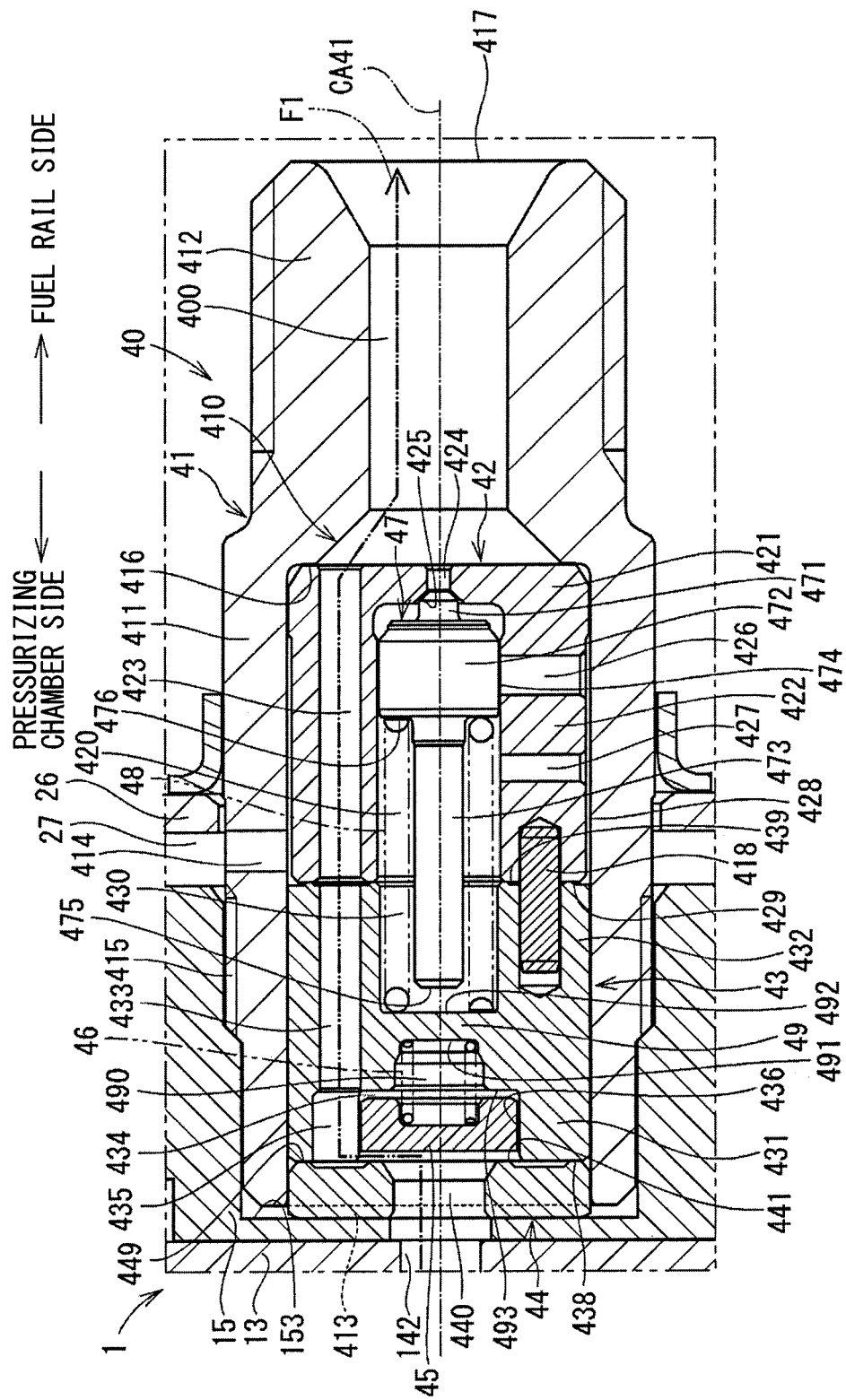
FIG. 5 is a cross-sectional view for describing an operation of the relief valve device according to the first embodiment of the present disclosure.
Figure 6:
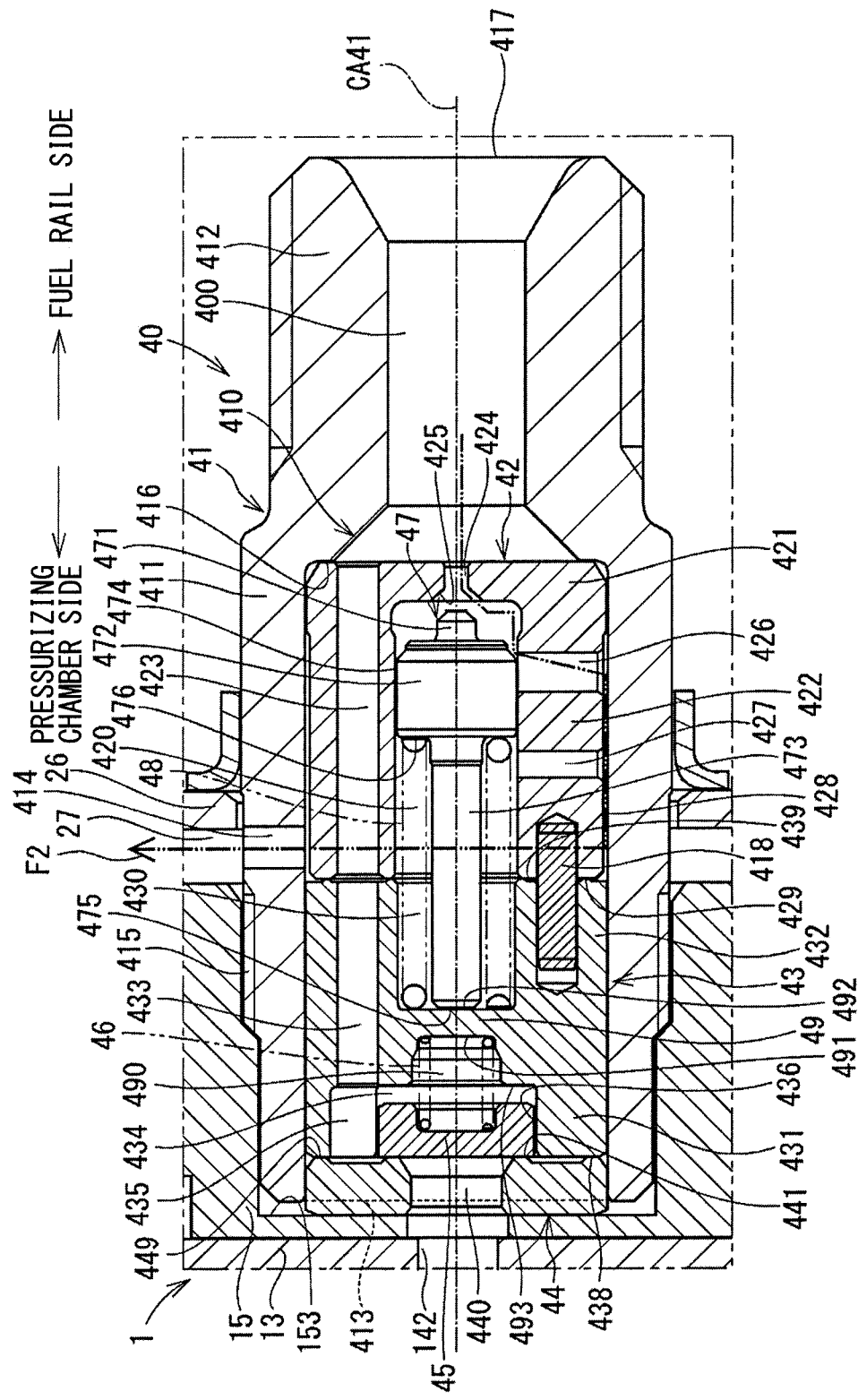
FIG. 6 is a cross-sectional view, which is different from the cross-sectional view of FIG. 5 and is for describing the operation of the relief valve device according to the first embodiment of the present disclosure.

As shown in FIG. 3, the fuel discharge relief device 40 includes: a discharge valve body 41 (serving as a casing); a first intermediate member 42 (serving as a relief-chamber forming member and a hollow member); a second intermediate member 43 (serving as a hollow member); a first-communication-hole forming member 44 (serving as a casing), a discharge valve member 45 (serving as a first valve member), a discharge valve spring 46 (serving as a first urging member), a relief valve member 47 (serving as a second valve member), and a relief valve spring 48 (serving as a second urging member). In FIGS. 3, 5 and 6, a side of the fuel discharge relief device 40, at which the pressurizing chamber 14 is placed, is indicated as a pressurizing chamber side, and an opposite side of the fuel discharge relief device 40, which is opposite from the pressurizing chamber 14, is indicated as a fuel rail side.

The discharge valve body 41 is shaped into a substantially tubular form. The discharge valve body 41 includes a large inner diameter portion 411 and a small inner diameter portion 412. The discharge valve body 41 includes an inside space 410 that extends through the discharge valve body 41 in a direction along a central axis CA41 of the discharge valve body 41.

The large inner diameter portion 411 is shaped into a substantially tubular form. When the fuel discharge relief device 40 is assembled to the high-pressure pump 1, the large inner diameter portion 411 is placed at the pressurizing chamber side of the discharge valve body 41. The large inner diameter portion 411 includes an opening 413 at the pressurizing chamber side of the large inner diameter portion 411. Furthermore, the large inner diameter portion 411 includes a relief passage 414 that is formed through an outer wall of the large inner diameter portion 411 and communicates between an inside and an outside of the large inner diameter portion 411. The relief passage 414 is communicated with the fuel gallery 27. A thread groove 415, which can be threadedly engaged with the upper housing 15, is formed at the outer wall of the large inner diameter portion 411.

The small inner diameter portion 412 is shaped into a substantially tubular form. When the fuel discharge relief device 40 is assembled to the high-pressure pump 1, the small inner diameter portion 412 is placed at the fuel rail side of the discharge valve body 41. An inner diameter of the small inner diameter portion 412 is smaller than an inner diameter of the large inner diameter portion 411. Therefore, an inner wall of the discharge valve body 41, which forms the inside space 410, has a step surface 416. The small inner diameter portion 412 includes an opening 417 at an opposite side of the small inner diameter portion 412, which is opposite from a side connected to the large inner diameter portion 411.

The first intermediate member 42 is a member shaped into a substantially tubular form having a bottom. The first intermediate member 42 is made of a material that has hardness higher than that of the discharge valve body 41. The first intermediate member 42 is received in the inside space 410. An outer diameter of the first intermediate member 42 is larger than the inner diameter of the small inner diameter portion 412. Therefore, when the first intermediate member 42 is inserted into the inside space 410 through the opening 413, the first intermediate member 42 contacts the step surface 416. Thus, the step surface 416 limits movement of the first intermediate member 42 toward the fuel rail side in the inside space 410.

Figure 4:
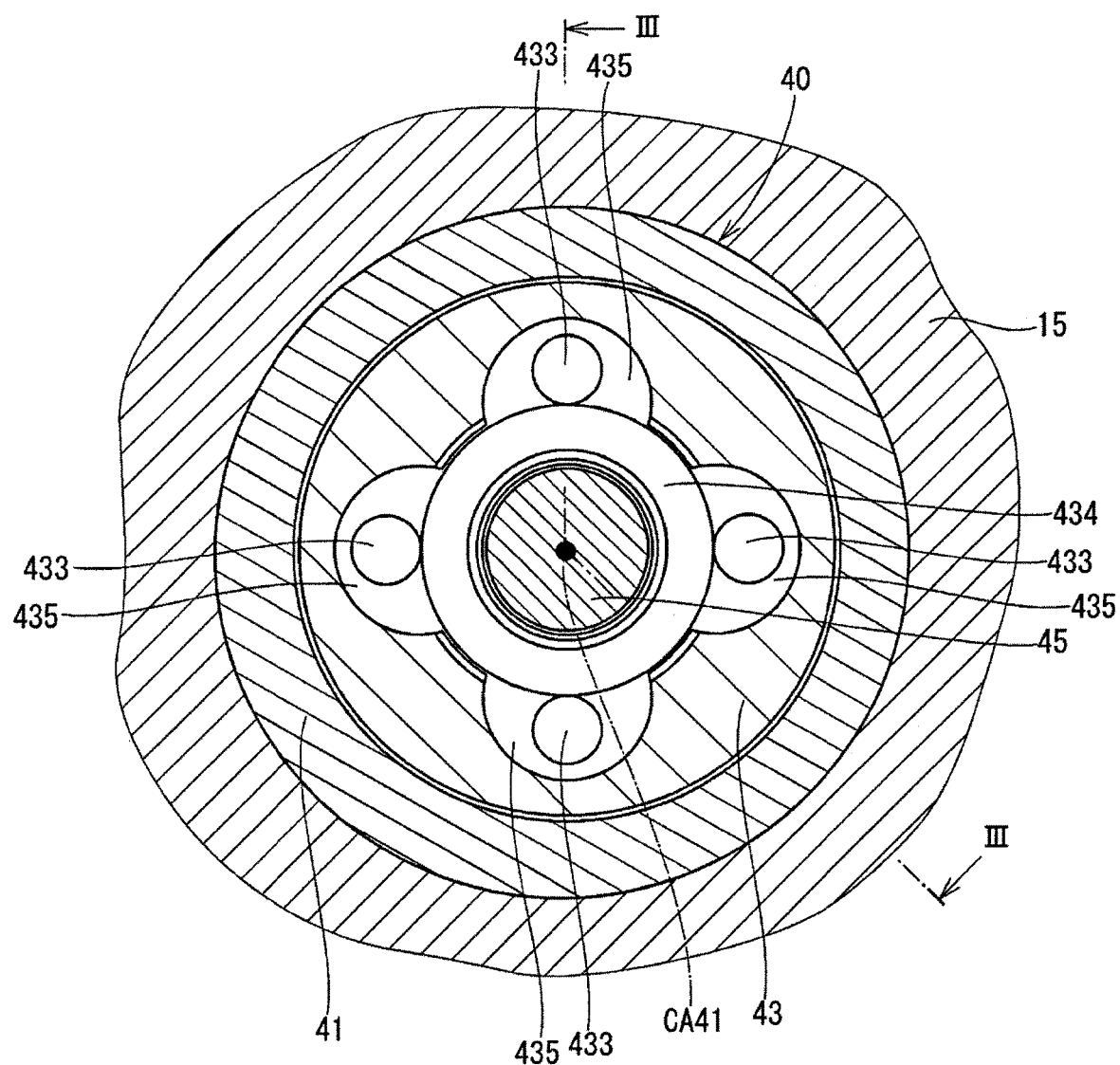
FIG. 4 is a cross-sectional view taken along line IV-IV in FIG. 3.

The first intermediate member 42 includes the bottom portion 421 and the tubular portion 422. The first intermediate member 42 includes a plurality of primary flow passages 423 (serving as a plurality of communication passages), which extend through the bottom portion 421 and the tubular portion 422 in the direction along the central axis CA41. As shown in FIG. 4, the primary flow passages 423 are arranged one after the other at equal intervals along a concentric circle that is centered at a point along the central axis CA41. The primary flow passages 423 are communicated with an inside space 400 placed on the fuel rail side of the first intermediate member 42.

The bottom portion 421 is placed such that the bottom portion 421 closes the opening of the tubular portion 422 placed on the fuel rail side. The bottom portion 421 contacts the step surface 416 and also contacts the inner wall of the large inner diameter portion 411. The bottom portion 421 defines a first relief chamber 420 (serving as a relief chamber) in corporation with the tubular portion 422. The bottom portion 421 includes a relief through hole 424 that communicates between the inside space 400 and the first relief chamber 420. A relief valve seat 425, against which the relief valve member 47 is contactable, is formed around the opening of the relief through hole 424 placed on the first relief chamber 420 side.

The tubular portion 422 includes communication passages 426, 427, which communicate between the first relief chamber 420 and a radially outer side of the tubular portion 422. The communication passage 426 is formed on the fuel rail side of the communication passage 427. An outer diameter of the tubular portion 422 is smaller than an inner diameter of the large inner diameter portion 411. Therefore, a gap 428 is formed between the tubular portion 422 and the large inner diameter portion 411. The communication passages 426, 427 are communicated with the gap 428. The gap 428 is communicated with the relief passage 414.

The second intermediate member 43 is a member shaped into a substantially tubular form having a bottom. The second intermediate member 43 is made of a material that has hardness higher than that of the discharge valve body 41. The second intermediate member 43 is received on the pressurizing chamber side of the first intermediate member 42 in the inside space 410. At this time, a second end surface 439 of the second intermediate member 43, which is located on the fuel rail side, contact a first end surface 429 of the first intermediate member 42, which is located on the pressurizing chamber side. Relative rotation between the first intermediate member 42 and the second intermediate member 43 is limited by a pin 418.

The second intermediate member 43 includes: a bottom portion 49 (serving as a partition wall); a first tubular portion 431; and a second tubular portion 432 (serving as a relief-chamber forming member and a tubular member). The second intermediate member 43 includes a plurality of secondary flow passages 433 (serving as a plurality of communication passages), which extend through the bottom portion 49 and the second tubular portion 432 in the direction along the central axis CA41. As shown in FIG. 4, the secondary flow passages 433 are arranged one after the other at equal intervals along a concentric circle that is centered at a point along the central axis CA41. The secondary flow passages 433 are communicated with the primary flow passages 423 on the fuel rail side. In the first embodiment, the bottom portion 49, the first tubular portion 431 and the second tubular portion 432 are integrally formed in one piece.

The bottom portion 49 is shaped into a substantially circular plate form. The bottom portion 49 is placed such that the bottom portion 49 closes an opening of the first tubular portion 431, which is located on the fuel rail side, and an opening of the second tubular portion 432, which is located on the pressurizing chamber side. The bottom portion 49 includes a recess 490 at a substantially center part of the bottom portion 49 on the pressurizing chamber side. A part of the discharge valve spring 46 is received in the recess 490.

The first tubular portion 431 is placed at the pressurizing chamber side of the second intermediate member 43. The first tubular portion 431 forms a space 434 (serving as a communication passage), which is configured to receive the discharge valve member 45, in corporation with the bottom portion 49. Furthermore, a plurality of connection flow passages 435 (serving as a plurality of communication passages), which are communicated with the space 434, is formed on a radially outer side of the space 434. As shown in FIG. 4, the connection flow passages 435 are arranged one after the other at equal intervals in a circumferential direction of the space 434. Each of the connection flow passages 435 is communicated with a corresponding one of the secondary flow passages 433 on the fuel rail side.

The second tubular portion 432 is placed at the fuel rail side of the second intermediate member 43. An outer wall of the second tubular portion 432, which is located at an outer side in the radial direction, contacts an inner wall of the large inner diameter portion 411. Therefore, the second end surface 439 of the second intermediate member 43 is exposed to the gap 428, as shown in FIG. 3. The second tubular portion 432 defines a second relief chamber 430 (serving as a relief chamber), which is communicated with the first relief chamber 420, in cooperation with the bottom portion 49.

The first-communication-hole forming member 44 is shaped into a substantially ring form, and the first-communication-hole forming member 44 is placed on the pressurizing chamber side of the second intermediate member 43. An end surface 449 of the first-communication-hole forming member 44, which is located on the fuel rail side, contacts an end surface 438 of the second intermediate member 43, which is located on the pressurizing chamber side. The first-communication-hole forming member 44 includes a first through hole 440 that extends through the first-communication-hole forming member 44 in the direction along the central axis CA41. The first through hole 440 is configured to communicate between the discharge hole 142 and the space 434. A discharge valve seat 441 (serving as a first valve seat), against which the discharge valve member 45 is contactable, is formed around an opening of the first through hole 440, which is located on the fuel rail side.

When the fuel discharge relief device 40 is assembled to the high-pressure pump 1, the first intermediate member 42, the second intermediate member 43 and the first-communication-hole forming member 44 are clamped between the step surface 416 and an inner wall of the upper housing 15, which forms the discharge passage 153. Thereby, the liquid tightness between the first intermediate member 42 and the second intermediate member 43 and the liquid tightness between the second intermediate member 43 and the first-communication-hole forming member 44 are maintained.

The discharge valve member 45 is a member that is shaped into a substantially circular plate form, and the discharge valve member 45 is received in the space 434. The discharge valve member 45 is configured to reciprocate along the central axis CA41. The discharge valve member 45 is slidable relative to an inner wall 436 of the first tubular portion 431. An outer diameter of the discharge valve member 45 is larger than an inner diameter of the recess 490. Thereby, when the discharge valve member 45 is moved toward the fuel rail side, the discharge valve member 45 contacts an end surface 493 of the bottom portion 49, which is located on the pressurizing chamber side. When the discharge valve member 45 contacts the discharge valve seat 441, the flow of the fluid between the first through hole 440 and the secondary flow passages 433 is blocked. In contrast, when the discharge valve member 45 is displaced away from the discharge valve seat 441, the flow of the fluid between the first through hole 440 and the secondary flow passages 433 is enabled.

One end of the discharge valve spring 46 contacts the discharge valve member 45. The other end of the discharge valve spring 46 contacts a discharge-valve-side bottom wall surface 491 of the bottom portion 49, which forms the recess 490. The discharge valve spring 46 urges the discharge valve member 45 against the discharge valve seat 441.

The relief valve member 47 is received in the first relief chamber 420 and the second relief chamber 430. The relief valve member 47 is configured to reciprocate along the central axis CA41. The relief valve member 47 includes a contact portion 471, a slide portion 472 and a shaft portion 473.

The contact portion 471 is formed at the fuel rail side of the relief valve member 47 and is configured to contact the relief valve seat 425. When the contact portion 471 contacts the relief valve seat 425, the flow of the fuel between the inside space 400 and the first relief chamber 420 is blocked. Furthermore, when the contact portion 471 is displaced away from the relief valve seat 425, the flow of the fuel between the inside space 400 and the first relief chamber 420 is enabled.

The slide portion 472 is shaped into a substantially cylindrical rod form and is located on the pressurizing chamber side of the contact portion 471. An outer diameter of the slide portion 472 is substantially the same as an inner diameter of the first relief chamber 420. Thereby, a radially outer wall surface 474 of the slide portion 472 is slidable along the inner wall surface of the tubular portion 422.

The communication passage 426 of the tubular portion 422 is placed at a location where the communication passage 426 is closed by the slide portion 472 upon contacting of the relief valve member 47 against the relief valve seat 425 and is opened on the fuel rail side of the slide portion 472 upon displacement of the relief valve member 47 away from the relief valve seat 425 (see FIG. 6).

The shaft portion 473 is shaped into a substantially rod form and is located on the pressurizing chamber side of the slide portion 472. An outer diameter of the shaft portion 473 is smaller than an outer diameter of the slide portion 472. At this time, an end surface 475 of the shaft portion 473, which is located on the pressurizing chamber side, is configured to contact a relief-valve-side bottom wall surface 492 of the bottom portion 49, which is located on the fuel rail side. When the end surface 475 contacts the relief-valve-side bottom wall surface 492, movement of the relief valve member 47 toward the pressurizing chamber side is limited.

The communication passage 427 of the tubular portion 422 of the first intermediate member 42 is positioned on the pressurizing chamber side of the slide portion 472.

One end of the relief valve spring 48 contacts an end surface 476 of the slide portion 472, which is located on the pressurizing chamber side. The other end of the relief valve spring 48 contacts the relief-valve-side bottom wall surface 492. The relief valve spring 48 urges the relief valve member 47 against the relief valve seat 425.

In the first embodiment, the discharge valve body 41, the first intermediate member 42, the second intermediate member 43 (particularly, the first tubular portion 431 and the second tubular portion 432) and the first-communication-hole forming member 44 serve as a valve housing.

Next, the operation of the high-pressure pump 1 of the present embodiment will be described with reference to FIG. 1.

Suction Stroke

In a state where the supply of the electric power to the coil 39 is stopped, the suction valve member 33 is urged by the spring 362 and the needle 36 toward the pressurizing chamber side. Therefore, the suction valve member 33 is spaced from the valve seat 32, and the fuel suction device 30 is placed in a state (hereinafter referred to as a valve opening state), in which the communication between the suction chamber 300 and the pressurizing chamber 14 is enabled. In the valve opening state, when the plunger 21 is moved toward the cam 19 side, the volume of the pressurizing chamber 14 is increased, and the fuel in the suction chamber 300 is suctioned into the pressurizing chamber 14.

Metering Stroke

In the valve opening state of the fuel suction device 30, when the plunger 21 is moved toward an opposite side, which is opposite from the cam 19, the volume of the pressurizing chamber 14 is reduced, and the fuel in the pressurizing chamber 14 is returned to the suction chamber 300. When the electric power is supplied to the coil 39 in the middle of the metering stroke, the needle 36 is moved toward the stationary core 38. Therefore, the applied force of the needle 36, which is applied to the suction valve member 33, is reduced. Therefore, the suction valve member 33 contacts the valve seat 32, and the fuel suction device 30 is placed in a state (hereinafter referred to as a valve closing state), in which communication between the suction chamber 300 and the pressurizing chamber 14 is blocked. The amount of the fuel, which is returned from the pressurizing chamber 14 to the suction chamber 300, is regulated by this timing, at which the state of the fuel suction device 30 is changed from the valve opening state to the valve closing state, so that the amount of the fuel, which is pressurized in the pressurizing chamber 14, is determined.

Pressurizing Stroke

In the valve closing state of the fuel suction device 30, when the plunger 21 is further moved toward the opposite side, which is opposite from the cam 19, the volume of the pressurizing chamber 14 is reduced, and the fuel in the pressurizing chamber 14 is pressurized. When the pressure of the fuel in the pressurizing chamber 14 becomes equal to or larger than a predetermined value, the discharge valve member 45 is displaced away from the discharge valve seat 441. Thereby, the fuel is supplied from the pressurizing chamber 14 to the fuel rail 8 through the fuel discharge relief device 40.

When the plunger 21 is moved toward the cam 19 side upon stopping of the supply of the electric power to the coil 39, the fuel suction device 30 is placed into the valve opening state once again. Thereby, the pressurization stroke for pressurizing the fuel ends, and the suction stroke for suctioning the fuel from the suction chamber 300 into the pressurizing chamber 14 restarts.

The high-pressure pump 1 repeats the suction stroke, the metering stroke and the pressurization stroke, and thereby the high-pressure pump 1 pressurizes and discharges the fuel, which is drawn from the fuel tank 7, to supply the pressurized fuel to the fuel rail 8. The supply amount of the fuel, which is supplied from the high-pressure pump 1 to the fuel rail 8, is regulated by controlling, for example, the supply timing of the electric power to the coil 39.

Next, the operation of the fuel discharge relief device 40 of the present embodiment will be described with reference to FIGS. 3, 5 and 6.

When the pressure of the fuel in the pressurizing chamber 14 is smaller than the predetermined value, the discharge valve member 45 is kept in contact with the discharge valve seat 441 (a state shown in FIG. 3). Thereby, the fuel of the pressurizing chamber 14 does not flow into the fuel discharge relief device 40, so that the fuel is kept pressurized in the pressurizing chamber 14.

When the pressure of the fuel in the pressurizing chamber 14 becomes equal to or larger than the predetermined value upon increasing of the pressure of the fuel in the pressurizing chamber 14 through the movement of the plunger 21, the discharge valve member 45 is displaced away from the discharge valve seat 441. When the discharge valve member 45 is displaced away from the discharge valve seat 441, the fuel of the discharge hole 142 flows into the inside space 400 through the first through hole 440, the space 434, the connection flow passages 435, the secondary flow passages 433 and the primary flow passages 423, as indicated by a dot-dot-dash line arrow F1 in FIG. 5. This fuel is supplied to the fuel rail 8 through the opening 417 and the fuel supply passage 18.

When a certain amount of fuel is supplied to the fuel rail 8, the pressure of the fuel in the pressurizing chamber 14 is decreased. When the pressure of the fuel in the pressurizing chamber 14 is decreased, the discharge valve member 45 is urged by the urging force of the discharge valve spring 46 and thereby contacts the discharge valve seat 441. Thereby, the communication between the discharge hole 142 and the space 434 is blocked.

Furthermore, at the fuel discharge relief device 40, the pressure of the fuel in the inside space 400 may possibly become equal to or larger than the relief pressure due to a malfunction of the fuel supply system 100 in some cases. In this case, the relief valve member 47 is displaced away from the relief valve seat 425. When the relief valve member 47 is displaced away from the relief valve seat 425, the fuel of the inside space 400 flows into the first relief chamber 420 through the relief through hole 424, as indicated by a dot-dot-dash line arrow F2 in FIG. 6. The fuel, which flows into the first relief chamber 420, is returned to the fuel gallery 27 through the communication passage 426, the gap 428 and the relief passage 414.

(a) In the fuel discharge relief device 40 of the first embodiment, the discharge valve spring 46 contacts the discharge-valve-side bottom wall surface 491 of the bottom portion 49. Furthermore, the relief valve spring 48 contacts the relief-valve-side bottom wall surface 492 of the bottom portion 49. Specifically, the bottom portion 49 is a common spring seat that is common to the discharge valve spring 46 and the relief valve spring 48. Therefore, a size of the fuel discharge relief device 40, which is measured in the direction along the central axis CA41, can be made relatively small.

Furthermore, in order to increase the relief pressure of the relief valve, the urging force of the urging member, which urges the relief valve member in the valve closing direction, needs to be increased. In the fuel discharge relief device 40, the discharge valve spring 46 and the relief valve spring 48 share the common spring seat. Therefore, even when the sizes of the first relief chamber 420 and the second relief chamber 430, which receive the relief valve member 47, are increased, it is possible to limit an increase in a size of the fuel discharge relief device 40.

As discussed above, the urging force of the relief valve spring 48 can be increased while the size of the fuel discharge relief device 40, which is measured in the direction along the central axis CA41, is made relative small. Therefore, the relief pressure can be set to a relatively high pressure.

(b) The discharge valve member 45 and the relief valve member 47 are configured to reciprocate along the central axis CA41. Specifically, the discharge valve member 45 and the relief valve member 47 are coaxial with each other. Therefore, it is relatively easy to ensure a sufficient wall thickness of the member, which forms the primary flow passages 423 and the secondary flow passages 433 that conduct the fuel having the relatively high pressure. In this way, the fuel discharge relief device 40 can be operated without being damaged even when the pressure of the fuel in the high-pressure pump 1 is further increased. In addition, the required pressure resistance against the high pressure fuel can be relatively easily ensured. Therefore, a size, which is measured in a direction that is perpendicular to the central axis CA41, can be made relatively small.

(c) Furthermore, in the fuel discharge relief device 40 of the first embodiment, at the time of relieving the fuel, the fuel, which flows from the inside space 400 into the first relief chamber 420, is returned to the fuel gallery 27. Therefore, in comparison to the case where the fuel, which is inputted into the relief chamber, is returned to the pressurizing chamber, the volume of the space communicated with the pressurizing chamber can be reduced. Thereby, a compression ratio of the fuel in the pressurizing chamber can be increased. Thus, a discharge efficiency of the high-pressure pump 1 can be improved.

(d) In the high-pressure pump 1, the fuel discharge relief device 40 is assembled to the upper housing 15 and the cover 26 as one subassembly, in which the discharge valve and the relief valve are integrated. In this way, the size of the high-pressure pump 1 can be reduced, and easy assembling of the high-pressure pump 1 can be implemented.

(e) In the fuel discharge relief device 40 of the first embodiment, the plurality of primary flow passages 423 and the plurality of secondary flow passages 433, which conduct the pressurized fuel, are formed. Therefore, a flow passage diameter of each of the primary flow passages 423 and the secondary flow passages 433 can be made relatively small, and thereby the pressure resistance against the high pressure fuel can be relatively easily ensured. The primary flow passages 423 and the secondary flow passages 433 are arranged along the concentric circle that is centered at the point along the central axis CA41, so that the primary flow passages 423 and the secondary flow passages 433 can be relatively easily formed.

(f) In the fuel discharge relief device 40 of the first embodiment, the first end surface 429 of the first intermediate member 42 and the second end surface 439 of the second intermediate member 43 contact with each other. Therefore, the primary flow passages 423 and the secondary flow passages 433 can be sealed by the force exerted in the direction along the central axis CA41. Therefore, for example, in comparison to the press fitting and the welding, the liquid tightness between the primary flow passages 423 and the secondary flow passages 433 can be reliably maintained while limiting the deformation of the first intermediate member 42 and the second intermediate member 43.

(g) Furthermore, as shown in FIG. 3, the second end surface 439 of the second intermediate member 43 is exposed to the gap 428. Specifically, the contact location, at which the first end surface 429 of the first intermediate member 42 and the second end surface 439 of the second intermediate member 43 contact with each other, is communicated with the fuel gallery 27 through the gap 428 and the relief passage 414. Therefore, the fuel, which leaks from location between the first end surface 429 and the second end surface 439, which are sealed through the contact between the first intermediate member 42 and the second intermediate member 43, can be returned to the fuel gallery 27.

(h) The first intermediate member 42 and the second intermediate member 43 are made of the material that has the higher hardness in comparison to the material of the discharge valve body 41. Therefore, a flow passage diameter of each of the primary flow passages 423 and the secondary flow passages 433 can be made relatively small, and thereby the required pressure resistance against the high pressure fuel can be relatively easily ensured.

In contrast, the discharge valve body 41, which is made of the material having the hardness that is lower than the hardness of the material of the first intermediate member 42 and the second intermediate member 43, can ensure the required strength thereof that is required to threadably fix the discharge valve body 41 relative to the upper housing 15 and the fuel supply passage 18.

SECOND EMBODIMENT

A relief valve device according to a second embodiment will be described with reference to FIG. 7. In the second embodiment, the shape of the relief-chamber forming member and the shape of the relief valve member differ from those of the first embodiment.

Figure 7:
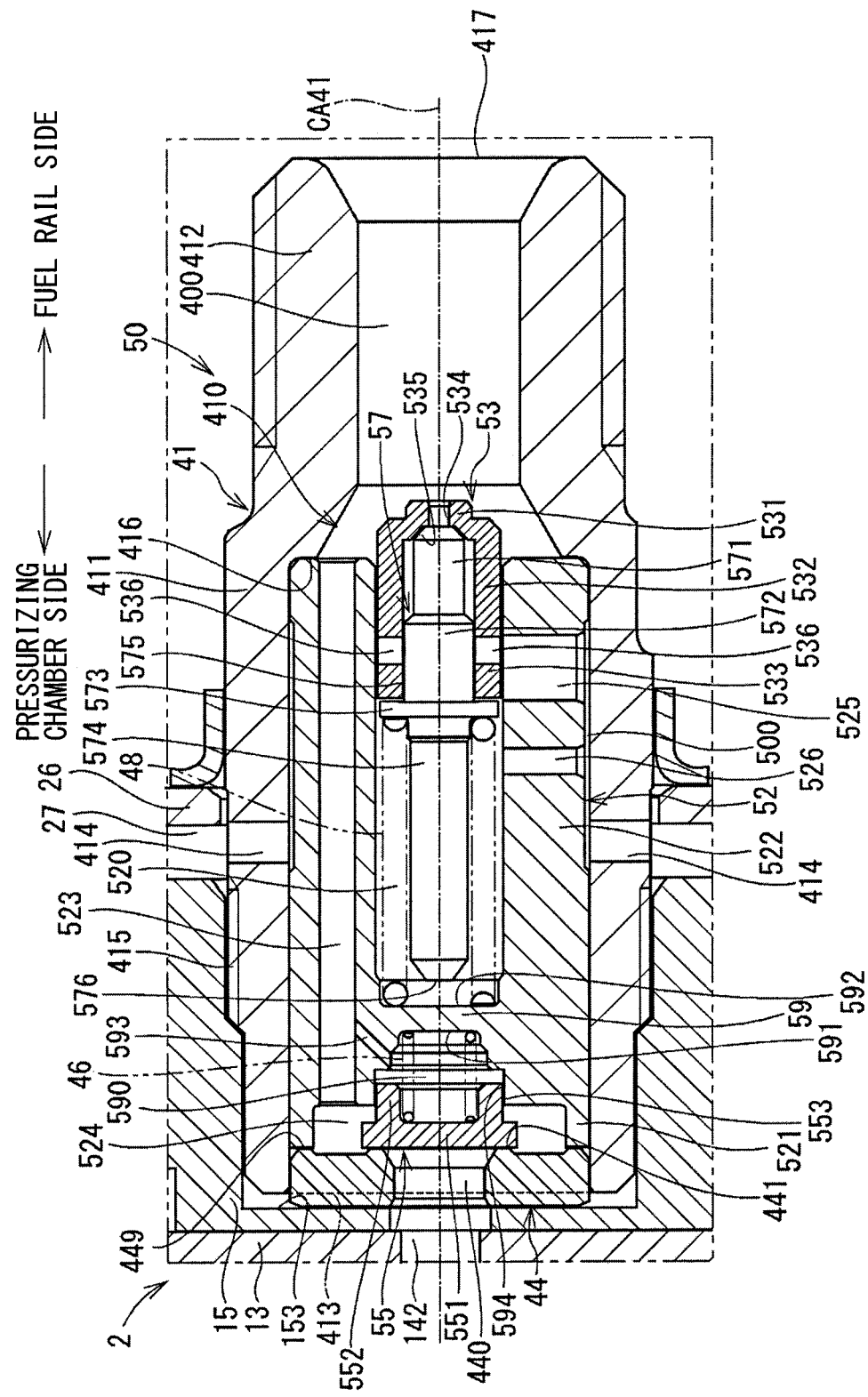
FIG. 7 is a cross-sectional view of a relief valve device according to a second embodiment of the present disclosure.

FIG. 7 shows a cross-sectional view of a fuel discharge relief device 50 used in a high-pressure pump 2 of the second embodiment.

The fuel discharge relief device 50 includes: the discharge valve body 41; a first intermediate member 52 (serving as a hollow member); a second intermediate member 53 (serving as a relief-chamber forming member, a relief seat member and a hollow member); the first-communication-hole forming member 44; a discharge valve member 55 (serving as a first valve member); the discharge valve spring 46; a relief valve member 57 (serving as a second valve member); and the relief valve spring 48. In FIG. 7, a side of the fuel discharge relief device 50, at which the pressurizing chamber 14 is placed, is indicated as a pressurizing chamber side, and an opposite side of the fuel discharge relief device 50, which is opposite from the pressurizing chamber 14, is indicated as a fuel rail side.

The first intermediate member 52 is a member shaped into a substantially tubular form having a bottom. The first intermediate member 52 is made of a material that has hardness higher than that of the discharge valve body 41. The first intermediate member 52 is received in the inside space 410. An outer diameter of the first intermediate member 52 is larger than the inner diameter of the small inner diameter portion 412. Therefore, when the first intermediate member 52 is inserted into the inside space 410 through the opening 413, the first intermediate member 52 contacts the step surface 416. Thus, the step surface 416 limits movement of the first intermediate member 52 toward the fuel rail side in the inside space 410.

The first intermediate member 52 includes a bottom portion 59 (serving as a partition wall), a first tubular portion 521 (serving as a tubular member), and a second tubular portion 522 (serving as a relief-chamber forming member and a tubular member). The first intermediate member 52 includes a plurality of flow passages 523 (serving as a plurality of communication passages), which extend through the bottom portion 59 and the second tubular portion 522 in the direction along the central axis CA41. In the second embodiment, the bottom portion 59, the first tubular portion 521 and the second tubular portion 522 are integrally formed in one piece.

The bottom portion 59 is shaped into a substantially circular plate form. The bottom portion 59 is placed such that the bottom portion 59 closes an opening of the first tubular portion 521, which is located on the fuel rail side, and an opening of the second tubular portion 522, which is located on the pressurizing chamber side. The bottom portion 59 includes a recess 590 (serving as an urging-member receiving chamber) at a substantially center part of the bottom portion 49 on the pressurizing chamber side. The recess 590 is communicated with the flow passage 523 through a communication passage 593 (serving as a receiving-chamber communication passage) of the bottom portion 59. A portion of the discharge valve spring 46 and a portion of the discharge valve member 55 are received in the recess 590. The other end of the discharge valve spring 46 contacts a discharge-valve-side bottom wall surface 591, which forms the recess 590. The other end of the relief valve spring 48 contacts a relief-valve-side bottom wall surface 592 of the bottom portion 59, which is located on the fuel rail side.

The first tubular portion 521 is formed at the pressurizing chamber side of the first intermediate member 52. The first tubular portion 521 forms a space 524 (serving as a communication passage), which is configured to receive the discharge valve member 55, in cooperation with the bottom portion 59. The space 524 is communicated with the flow passages 523.

The second tubular portion 522 is formed at the fuel rail side of the first intermediate member 52. The second tubular portion 522 defines the relief chamber 520 in cooperation with the bottom portion 59 and the second intermediate member 53. The second tubular portion 522 includes communication passages 525, 526, which communicate between the relief chamber 520 and a radially outer side of the second tubular portion 522. The communication passage 526 is formed on the pressurizing chamber side of the communication passage 525. The communication passages 525, 526 are communicated with a gap 500 formed between the second tubular portion 522 and the inner wall of the large inner diameter portion 411. The gap 500 is communicated with the relief passage 414.

The second intermediate member 53 is a tubular member having a bottom and is securely press fitted into an inside of an end of the second tubular portion 522 located on the fuel rail side. The second intermediate member 53 includes a relief valve seat portion 531, an outside contact portion 532 and an inside slide portion 533.

The relief valve seat portion 531 is located at the fuel rail side in the second intermediate member 53. The relief valve seat portion 531 projects from the second tubular portion 522 toward the fuel rail side. The relief valve seat portion 531 includes a relief through hole 534, which communicates between the inside space 400 and the inside of the outside contact portion 532. A relief valve seat 535, against which the relief valve member 57 is contactable, is formed around the opening of the relief through hole 534 placed on the pressurizing chamber side.

The outside contact portion 532 is shaped into a substantially tubular form and is located on the pressurizing chamber side of the relief valve seat portion 531. An outer wall of the outside contact portion 532, which is located at an outer side in the radial direction, contacts an inner wall of the second tubular portion 522.

The inside slide portion 533 is shaped into a substantially tubular form and is located on the pressurizing chamber side of the outside contact portion 532. The inside slide portion 533 includes a plurality of communication holes 536, which communicate between an inside and an outside of the second intermediate member 53 in the radial direction. The communication holes 536 are communicated with the communication passage 525 of the second tubular portion 522.

The discharge valve member 55 includes a contact portion 551 and a slide portion 552. The discharge valve member 55 is received in the space 524 and the recess 590 and is configured to reciprocate along the central axis CA41. When the discharge valve member 55 contacts the discharge valve seat 441, the flow of the fluid between the first through hole 440 and the flow passages 523 is blocked. In contrast, when the discharge valve member 55 is displaced away from the discharge valve seat 441, the flow of the fluid between the first through hole 440 and the flow passages 523 is enabled.

The contact portion 551 is shaped into a substantially circular plate form and is configured to contact the discharge valve seat 441. The one end of the discharge valve spring 46 contacts an end surface of the contact portion 551 located on the fuel rail side.

The slide portion 552 is shaped into a tubular form and is located on the fuel rail side of the contact portion 551. A radially outer peripheral wall 553 of the slide portion 552 is slidable relative to a peripheral wall 594 (serving as an inner wall of a valve housing that forms an urging-member receiving chamber) of the recess 590. In this way, the reciprocation of the discharge valve member 55 is guided.

The relief valve member 57 is received in the inside of the second intermediate member 53 and the relief chamber 520. The relief valve member 57 is configured to reciprocate along the central axis CA41. The relief valve member 57 includes a valve-seat contact portion 571, an outside slide portion 572, a flange portion 573 and a shaft portion 574.

The valve-seat contact portion 571 is formed at the fuel rail side of the relief valve member 57 and is configured to contact the relief valve seat 535. When the valve-seat contact portion 571 contacts the relief valve seat 535, the flow of the fuel between the inside space 400 and the inside of the outside contact portion 532 is blocked. Furthermore, when the valve-seat contact portion 571 is displaced away from the relief valve seat 535, the flow of the fuel between the inside space 400 and the inside of the outside contact portion 532 is enabled.

The outside slide portion 572 is shaped into a substantially cylindrical rod form and is located on the pressurizing chamber side of the valve-seat contact portion 571. An outer diameter of the outside slide portion 572 is substantially equal to an inner diameter of the inside slide portion 533. A radially outer wall surface 575 of the outside slide portion 572 is slidable relative to an inner wall surface of the inside slide portion 533.

The communication holes 536 of the inside slide portion 533 of the second intermediate member 53 are formed at a corresponding location where the communication holes 536 are closed by the outside slide portion 572 at the time of contacting the relief valve member 57 against the relief valve seat 535 and are opened toward the fuel rail side of the outside slide portion 572 at the time of spacing the relief valve member 57 away from the relief valve seat 535.

The flange portion 573 is shaped into a substantially circular plate form and is located on the pressurizing chamber side of the outside slide portion 572. An outer diameter of the flange portion 573 is larger than an inner diameter of the inside slide portion 533 and is located on the pressurizing chamber side of the second intermediate member 53, as shown in FIG. 7. The flange portion 573 supports one end of the relief valve spring 48.

The shaft portion 574 is shaped into a substantially rod form and is located on the pressurizing chamber side of the flange portion 573. An end surface 576 of the shaft portion 574, which is located on the pressurizing chamber side, is configured to contact the relief-valve-side bottom wall surface 592 of the bottom portion 59. When the end surface 576 contacts the relief-valve-side bottom wall surface 592, movement of the relief valve member 57 toward the pressurizing chamber side is limited.

The communication passage 526 of the second tubular portion 522 of the first intermediate member 52 is positioned on the pressurizing chamber side of the outside slide portion 572.

In the second embodiment, the discharge valve body 41, the first-communication-hole forming member 44, the first intermediate member 52 (particularly, the first tubular portion 521 and the second tubular portion 522) and the second intermediate member 53 serve as a valve housing.

The fuel discharge relief device 50 of the second embodiment achieves the advantages (a) to (e) and (h) of the first embodiment.

(i) Furthermore, the fuel discharge relief device 50 of the second embodiment forms the relief chamber 520 by inserting the second intermediate member 53 into the inside of the first intermediate member 52. Thereby, in comparison to the first embodiment, in which the relief chamber is formed by combining the two members having the identical size, the number of the components, which form the relief chamber, can be reduced.

(j) The second intermediate member 53 includes the relief valve seat portion 531, the outside contact portion 532 and the inside slide portion 533. The relief valve seat portion 531, the outside contact portion 532 and the inside slide portion 533 are respectively placed at different locations along the central axis CA41. In this way, the radially-outer-side applied force, which is applied from the first intermediate member 52 to the outside contact portion 532, and the radially-inner-side applied force, which is applied from the relief valve member 57 to the inside slide portion 533, are applied at different locations, which are displaced from each other along the central axis CA41. Therefore, deformation of the relief valve seat portion 531, which is caused by these applied forces, can be limited, and thereby the valve opening can be accurately executed at a pressure that is equal to or higher than the preset relief pressure.

(k) Furthermore, since the flow passages 523, which conduct the high pressure fuel, can be formed by the single member, the fuel can be supplied to the fuel rail 8 while maintaining the high pressure.

(l) In the fuel discharge relief device 50 of the second embodiment, the reciprocation of the discharge valve member 55 is guided by the peripheral wall 594 of the recess 590. In this way, the valve opening and the valve closing can be stably executed with respect to the flow of the fuel from the pressurizing chamber 14 to the fuel rail 8.

(m) Furthermore, the bottom portion 59 includes the communication passage 593 that communicates the recess 590 to the flow passage 523. When the discharge valve member 55 is displaced away from the discharge valve seat 441, the fuel of the recess 590 is outputted to the flow passage 523 through the communication passage 593 in response to the movement of the discharge valve member 55. In this way, it is possible to limit occurrence of moving difficulty of the discharge valve member 55 toward the fuel rail side, which would be caused by the pressure of the fuel in the recess 590, at the time of moving the discharge valve member 55 away from the discharge valve seat 441.

THIRD EMBODIMENT

A relief valve device according to a third embodiment will be described with reference to FIG. 8. In the third embodiment, a shape of the discharge valve member differs from that of the first embodiment.

Figure 8:
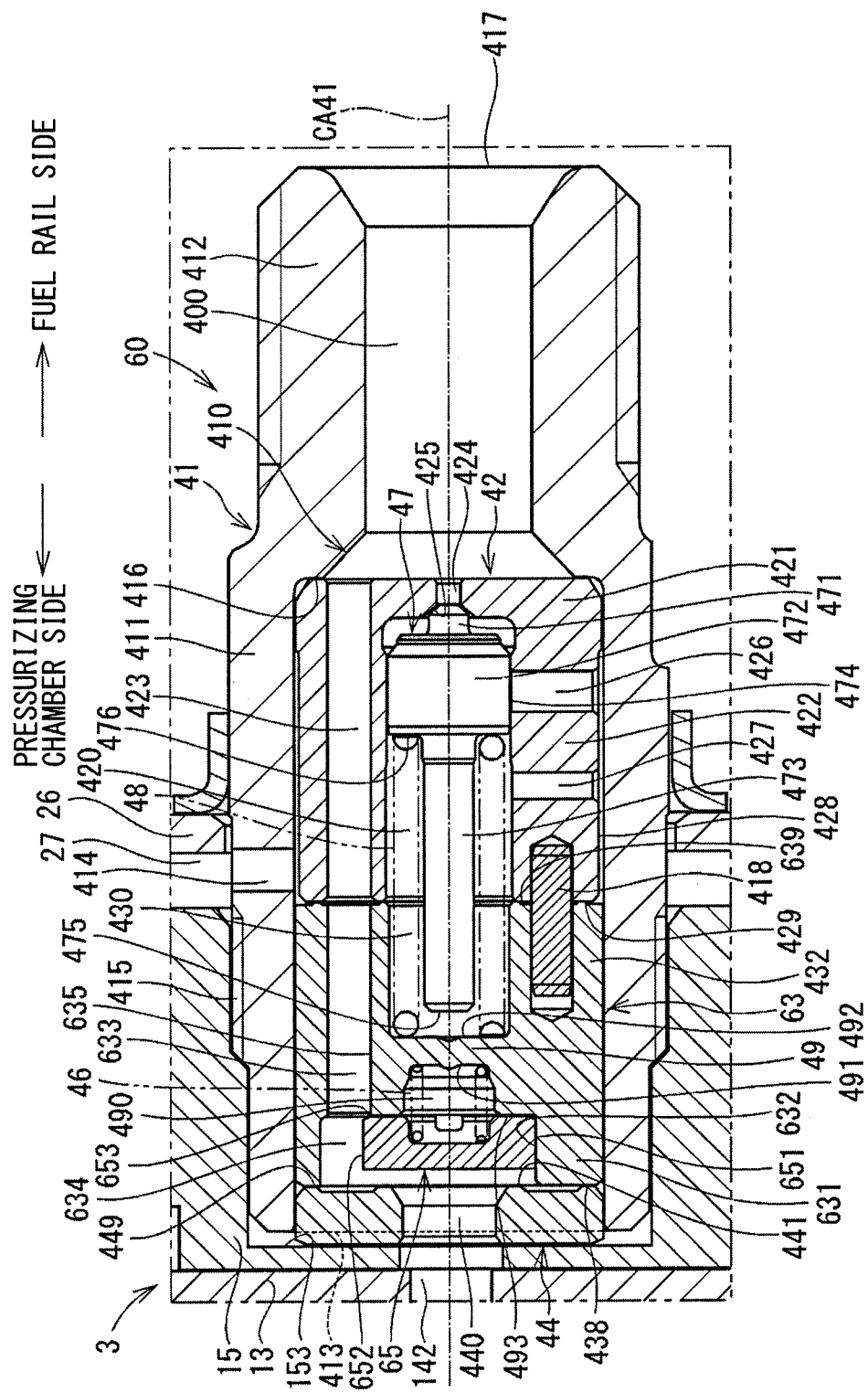
FIG. 8 is a cross-sectional view of a relief valve device according to a third embodiment of the present disclosure.

FIG. 8 shows a cross-sectional view of a fuel discharge relief device 60 used in a high-pressure pump 3 of the third embodiment.

The fuel discharge relief device 60 includes: the discharge valve body 41; the first intermediate member 42; a second intermediate member 63 (serving as a hollow member); the first-communication-hole forming member 44; a discharge valve member 65 (serving as a first valve member); the discharge valve spring 46; the relief valve member 47; and the relief valve spring 48. In FIG. 8, a side of the fuel discharge relief device 60, at which the pressurizing chamber 14 is placed, is indicated as a pressurizing chamber side, and an opposite side of the fuel discharge relief device 60, which is opposite from the pressurizing chamber 14, is indicated as a fuel rail side.

The second intermediate member 63 is a member shaped into a substantially tubular form having a bottom. The second intermediate member 63 is made of a material that has hardness higher than that of the discharge valve body 41. The second intermediate member 63 is received on the pressurizing chamber side of the first intermediate member 42 in the inside space 410. At this time, a second end surface 639 of the second intermediate member 63, which is located on the fuel rail side, contact the first end surface 429 of the first intermediate member 42, which is located on the pressurizing chamber side. Relative rotation between the first intermediate member 42 and the second intermediate member 63 is limited by the pin 418.

The second intermediate member 63 includes the bottom portion 49, a first tubular portion 631 and the second tubular portion 432. The second intermediate member 63 includes a plurality of secondary flow passages 633 (serving as a plurality of communication passages), which extend through the bottom portion 49 and the second tubular portion 432 in the direction along the central axis CA41. The secondary flow passages 633 are communicated with the primary flow passages 423 on the fuel rail side.

The first tubular portion 631 is formed at the pressurizing chamber side of the second intermediate member 63. The first tubular portion 631 forms a space 634 (serving as a communication passage), which is configured to receive the discharge valve member 65, in corporation with the bottom portion 49. The space 634 is communicated with the secondary flow passages 633 on the fuel rail side.

The discharge valve member 65 is shaped into a circular plate form and is received in the space 634 such that the discharge valve member 65 is configured to reciprocate in the space 634. When the discharge valve member 65 contacts the discharge valve seat 441, the flow of the fluid between the first through hole 440 and the secondary flow passages 633 is blocked. In contrast, when the discharge valve member 65 is displaced away from the discharge valve seat 441, the flow of the fluid between the first through hole 440 and the secondary flow passages 633 is enabled.

A portion 651 of a radially outer wall surface of the discharge valve member 65 is slidable relative to an inner wall 632 of the first tubular portion 631 of the second intermediate member 63. Furthermore, in an inner peripheral wall of each secondary flow passage 633, a radially inward wall part is referred to as an inner wall 635. In such a case, a portion 652 of the radially outer wall surface of the discharge valve member 65 is formed at a location that is further spaced from the central axis CA41 in comparison to the inner wall 635 of each secondary flow passage 633. Specifically, a portion of the end surface 653 of the discharge valve member 65, which is located on the fuel rail side, is exposed to the secondary flow passages 433.

In the third embodiment, the discharge valve body 41, the first intermediate member 42, the second intermediate member 63 (particularly, the first tubular portion 631 and the second tubular portion 432) and the first-communication-hole forming member 44 serve as a valve housing.

The fuel discharge relief device 60 of the third embodiment achieves the advantages (a) to (h) of the first embodiment.

(n) Furthermore, in the high-pressure pump 3, when the supply of the fuel from the pressurizing chamber 14 to the fuel rail 8 ends, suck back, which is a phenomenon of returning the fuel from the fuel rail 8 to the pressurizing chamber 14, occurs. In the fuel discharge relief device 60, the fuel, which flows due to the suck back, collides against the end surface 653, so that rapid valve closing of the discharge valve member 65 can be implemented. In this way, the fuel discharge relief device 60 can reduce the suck back of the fuel and can improve the discharge efficiency.

FOURTH EMBODIMENT

A relief valve device according to a fourth embodiment will be described with reference to FIG. 9. In the fourth embodiment, a shape of the discharge valve member differs from that of the second embodiment.

Figure 9:
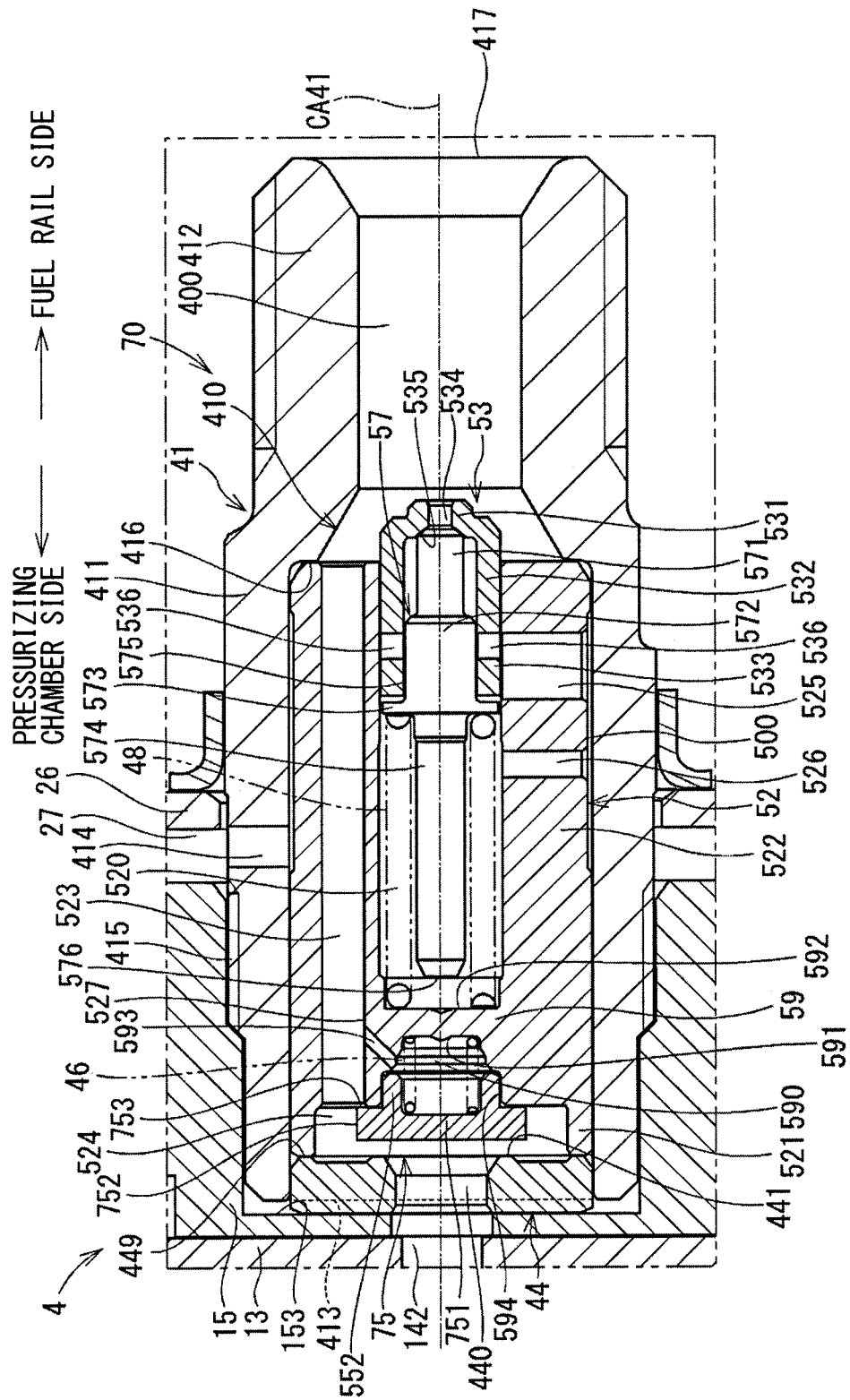
FIG. 9 is a cross-sectional view of a relief valve device according to a fourth embodiment of the present disclosure.

FIG. 9 shows a cross-sectional view of a fuel discharge relief device 70 used in a high-pressure pump 4 of the fourth embodiment.

The fuel discharge relief device 70 includes: the discharge valve body 41; the first intermediate member 52; the second intermediate member 53; the first-communication-hole forming member 44; a discharge valve member 75 (serving as a first valve member); the discharge valve spring 46; the relief valve member 57; and the relief valve spring 48. In FIG. 9, a side of the fuel discharge relief device 70, at which the pressurizing chamber 14 is placed, is indicated as a pressurizing chamber side, and an opposite side of the fuel discharge relief device 70, which is opposite from the pressurizing chamber 14, is indicated as a fuel rail side.

The discharge valve member 75 includes a contact portion 751 and a slide portion 552. The discharge valve member 75 is received in the space 524 and the recess 590 and is configured to reciprocate along the central axis CA41. When the discharge valve member 75 contacts the discharge valve seat 441, the flow of the fluid between the first through hole 440 and the flow passages 523 is blocked. In contrast, when the discharge valve member 75 is displaced away from the discharge valve seat 441, the flow of the fluid between the first through hole 440 and the flow passages 523 is enabled.

The contact portion 751 is shaped into a substantially circular plate form and is configured to contact the discharge valve seat 441. The one end of the discharge valve spring 46 contacts an end surface of the contact portion 751 located on the fuel rail side. Furthermore, in an inner peripheral wall of each flow passage 523, a radially inward wall part is referred to as an inner wall 527. In such a case, a portion 752 of the radially outer wall surface of the discharge valve member 65 is formed at a location that is further spaced from the central axis CA41 in comparison to the inner wall 527 of each flow passage 523. In this way, a portion of the end surface 753 of the discharge valve member 75, which is located on the fuel rail side, is exposed to the flow passages 523.

In the fourth embodiment, the discharge valve body 41, the first-communication-hole forming member 44, the first intermediate member 52 (particularly, the first tubular portion 521 and the second tubular portion 522) and the second intermediate member 53 serve as a valve housing.

The fuel discharge relief device 70 of the fourth embodiment achieves the advantages (a) to (h) of the first embodiment, the advantages (i) to (m) of the second embodiment and the advantage (n) of the third embodiment.

FIFTH EMBODIMENT

A relief valve device according to a fifth embodiment will be described with reference to FIG. 10. In the fifth embodiment, the position of the discharge valve member and the position of the relief valve member relative to the central axis of the discharge valve body differ from those of the first embodiment.

Figure 10:
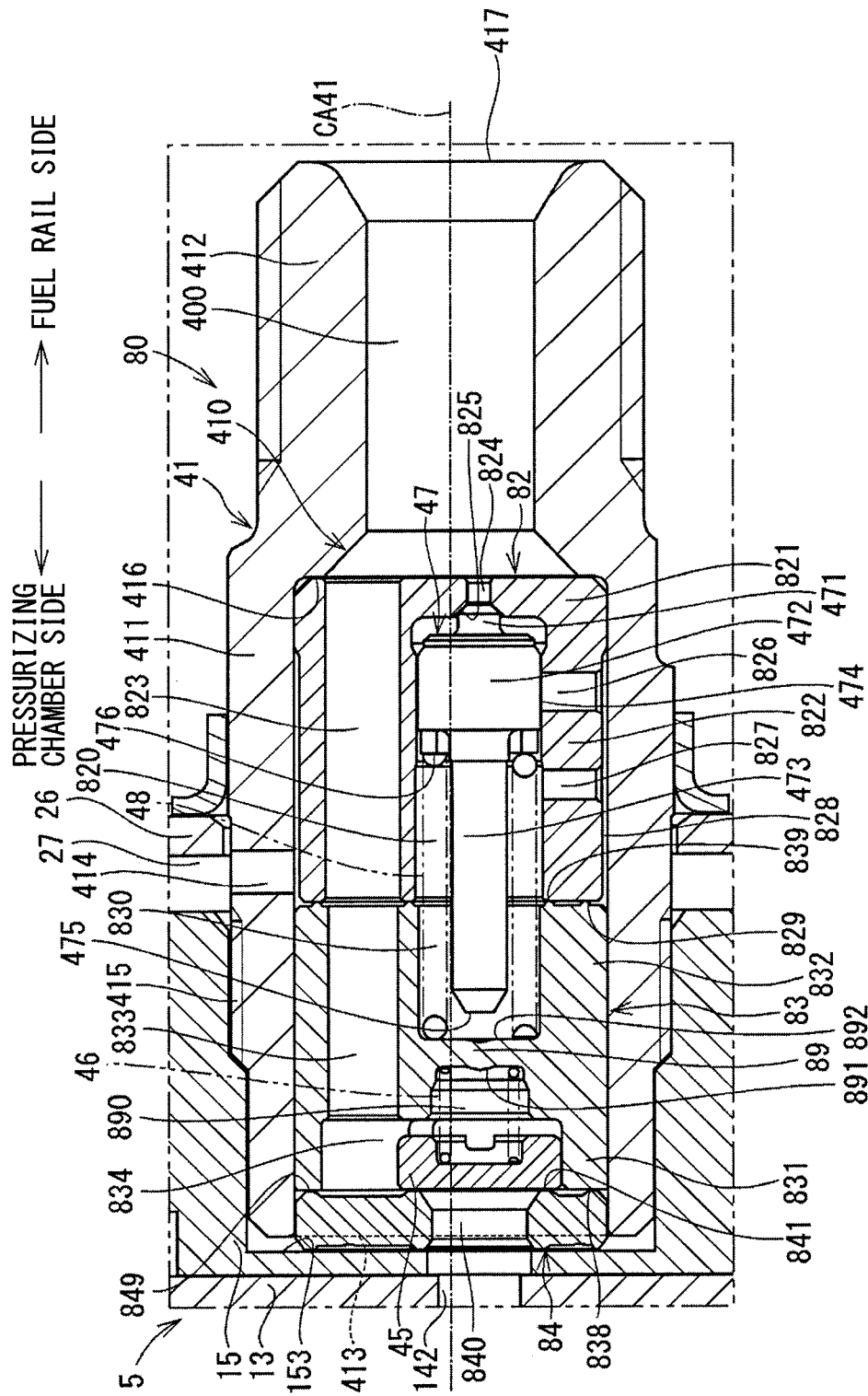
FIG. 10 is a cross-sectional view of a relief valve device according to a fifth embodiment of the present disclosure.

FIG. 10 shows a cross-sectional view of a fuel discharge relief device 80 used in a high-pressure pump 2 of the fifth embodiment.

The fuel discharge relief device 80 includes: the discharge valve body 41; a first intermediate member 82 and a second intermediate member 83 (respectively or collectively serving as a relief-chamber forming member and a hollow member); a first-communication-hole forming member 84 (serving as a valve casing); the discharge valve member 45; the discharge valve spring 46; the relief valve member 47; and the relief valve spring 48. In FIG. 10, a side of the fuel discharge relief device 80, at which the pressurizing chamber 14 is placed, is indicated as a pressurizing chamber side, and an opposite side of the fuel discharge relief device 80, which is opposite from the pressurizing chamber 14, is indicated as a fuel rail side.

The first intermediate member 82 is a member shaped into a substantially tubular form having a bottom. The first intermediate member 82 is made of a material that has hardness higher than that of the discharge valve body 41. The first intermediate member 82 is received in the inside space 410. An outer diameter of the first intermediate member 82 is larger than the inner diameter of the small inner diameter portion 412. Therefore, when the first intermediate member 82 is inserted into the inside space 410 through the opening 413, the first intermediate member 82 contacts the step surface 416. Thus, the step surface 416 limits movement of the first intermediate member 82 toward the fuel rail side in the inside space 410.

The first intermediate member 82 includes a bottom portion 821 and a tubular portion 822. The first intermediate member 82 includes a primary flow passage 823 (serving as a communication passage), which extends through the bottom portion 821 and the tubular portion 822 in the direction along the central axis CA41. The single primary flow passage 823 is placed at a location that is radially displaced from the central axis CA41. The primary flow passage 823 is communicated with the inside space 400.

The bottom portion 821 is placed such that the bottom portion 821 closes the opening of the tubular portion 822, which is located on the fuel rail side. The bottom portion 821 defines a first relief chamber 820 (serving as a relief chamber) at a location, which is decentered from the central axis CA41, in corporation with the tubular portion 822. The bottom portion 821 includes a relief through hole 824 that communicates between the inside space 400 and the first relief chamber 820. A relief valve seat 825, against which the relief valve member 47 is contactable, is formed around the opening of the relief through hole 824 placed on the first relief chamber 820 side.

The tubular portion 822 includes communication passages 826, 827, which communicate between the first relief chamber 820 and a radially outer side of the tubular portion 822. The communication passage 826 is placed at a location where the communication passage 827 is closed by the slide portion 472 upon contacting of the relief valve member 47 against the relief valve seat 825 and is opened on the fuel rail side of the slide portion 472 upon displacement of the relief valve member 47 away from the relief valve seat 825. The communication passage 827 is positioned on the pressurizing chamber side of the slide portion 472. The communication passages 826, 827 are communicated with a gap 828 formed between the tubular portion 822 and the inner wall of the large inner diameter portion 411.

The second intermediate member 83 is a member shaped into a substantially tubular form having a bottom. The second intermediate member 83 is made of a material that has hardness higher than that of the discharge valve body 41. The second intermediate member 83 is received in the inside space 410 at a location that is on the pressurizing chamber side of the first intermediate member 82. At this time, a second end surface 839 of the second intermediate member 83, which is located on the fuel rail side, contact a first end surface 829 of the first intermediate member 42, which is located on the pressurizing chamber side.

The second intermediate member 83 includes: a bottom portion 89 (serving as a partition wall); a first tubular portion 831; a second tubular portion 832 (serving as a relief-chamber forming member and a tubular member). The second intermediate member 83 includes a secondary flow passage 833 (serving as a communication passage), which extends through the bottom portion 89 and the second tubular portion 832 in the direction along the central axis CA41. The single secondary flow passage 833 is placed at a location that is radially displaced from the central axis CA41. The secondary flow passage 833 is communicated with the primary flow passage 823 on the fuel rail side. In the fifth embodiment, the bottom portion 89, the first tubular portion 831 and the second tubular portion 832 are integrally formed in one piece.

The bottom portion 89 is shaped into a substantially circular plate form. The bottom portion 89 is placed such that the bottom portion 89 closes an opening of the first tubular portion 831, which is located on the fuel rail side, and an opening of the second tubular portion 832, which is located on the pressurizing chamber side. The bottom portion 89 includes a recess 890 at a substantially center part of the bottom portion 89 on the pressurizing chamber side. A part of the discharge valve spring 46 is received in the recess 890. The other end of the discharge valve spring 46 contacts a discharge-valve-side bottom wall surface 891, which forms the recess 890. The other end of the relief valve spring 48 contacts a relief-valve-side bottom wall surface 892 of the bottom portion 89, which is located on the fuel rail side.

The first tubular portion 831 is formed at the pressurizing chamber side of the second intermediate member 83. The first tubular portion 831 forms a space 834 (serving as a communication passage), which is configured to receive the discharge valve member 45, in corporation with the bottom portion 89. The space 834 is communicated with the secondary flow passage 833 on the fuel rail side.

The second tubular portion 832 is placed at the fuel rail side of the second intermediate member 83. The second tubular portion 832 defines a second relief chamber 830 (serving as a relief chamber), which is communicated with the first relief chamber 820, in cooperation with the bottom portion 89.

The first-communication-hole forming member 84 is shaped into a substantially ring form, and the first-communication-hole forming member 84 is placed on the pressurizing chamber side of the second intermediate member 83. An end surface 849 of the first-communication-hole forming member 84, which is located on the fuel rail side, contacts an end surface 838 of the second intermediate member 83, which is located on the pressurizing chamber side. The first-communication-hole forming member 84 includes a first through hole 840 that extends through the first-communication-hole forming member 84 in the direction along the central axis CA41. The first through hole 840 is formed at a location that is different from a location along the central axis CA41. The first through hole 840 is configured to communicate between the discharge hole 142 and the space 834. A discharge valve seat 841 (serving as a first valve seat), against which the discharge valve member 45 is contactable, is formed around an opening of the first through hole 840, which is located on the fuel rail side.

In the fifth embodiment, the discharge valve body 41, the first intermediate member 82, the second intermediate member 83 (particularly, the first tubular portion 831 and the second tubular portion 832) and the first-communication-hole forming member 84 serve as a valve housing.

The fuel discharge relief device 80 of the fifth embodiment achieves the advantages (a), (c), (d), (f), (g) and (h) of the first embodiment.

The fuel discharge relief device 80 includes the single primary flow passage 823 and the single secondary flow passage 833, which conduct the high pressure fuel. This makes it possible to reduce the processing costs as compared with a case of forming a plurality of flow passages.

SIXTH EMBODIMENT

A relief valve device according to a sixth embodiment will be described with reference to FIG. 11. In the sixth embodiment, the position of the discharge valve member and the position of the relief valve member relative to the central axis of the discharge valve body differ from those of the second embodiment.

Figure 11:
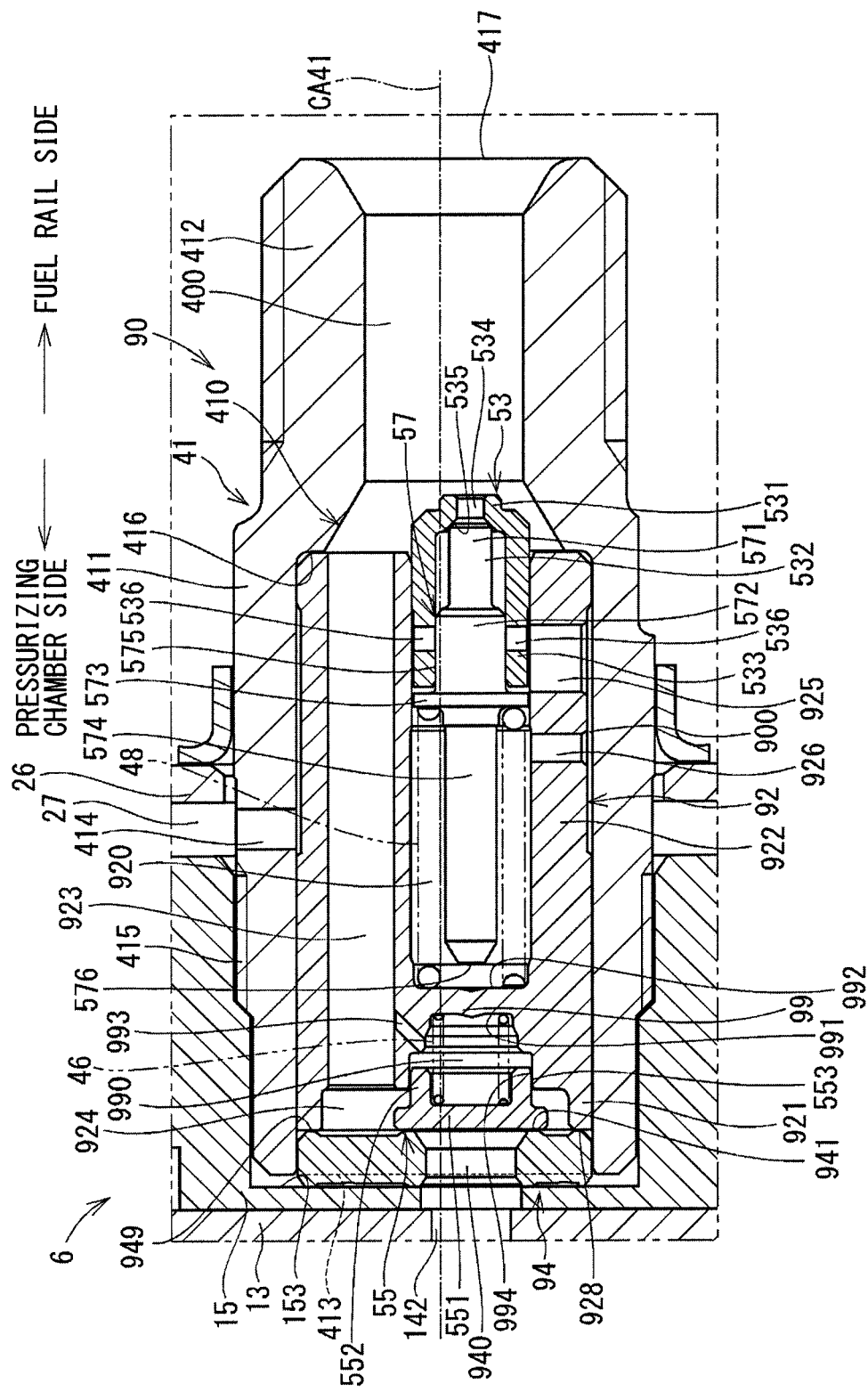
FIG. 11 is a cross-sectional view of a relief valve device according to a sixth embodiment of the present disclosure.

FIG. 11 shows a cross-sectional view of a fuel discharge relief device 90 used in a high-pressure pump 6 of the sixth embodiment.

The fuel discharge relief device 90 includes: the discharge valve body 41; a first intermediate member 92 (serving as a hollow member); the second intermediate member 53; a first-communication-hole forming member 94 (serving as a valve casing); the discharge valve member 55; the discharge valve spring 46; the relief valve member 57; and the relief valve spring 48. In FIG. 11, a side of the fuel discharge relief device 90, at which the pressurizing chamber 14 is placed, is indicated as a pressurizing chamber side, and an opposite side of the fuel discharge relief device 90, which is opposite from the pressurizing chamber 14, is indicated as a fuel rail side.

The first intermediate member 92 is a member shaped into a substantially tubular form having a bottom. The first intermediate member 92 is made of a material that has hardness higher than that of the discharge valve body 41. The first intermediate member 92 is received in the inside space 410. An outer diameter of the first intermediate member 92 is larger than the inner diameter of the small inner diameter portion 412. Therefore, when the first intermediate member 92 is inserted into the inside space 410 through the opening 413, the first intermediate member 92 contacts the step surface 416. Thus, the step surface 416 limits movement of the first intermediate member 92 toward the fuel rail side in the inside space 410.

The first intermediate member 92 includes a bottom portion 99 (serving as a partition wall), a first tubular portion 921 (serving as a tubular member), and a second tubular portion 922 (serving as a relief-chamber forming member and a tubular member). The first intermediate member 92 includes a flow passage 923 (serving as a communication passage), which extend through the bottom portion 99 and the second tubular portion 922 in the direction along the central axis CA41. The flow passage 923 is formed at a location that is radially displaced from the central axis CA41. In the sixth embodiment, the bottom portion 99, the first tubular portion 921 and the second tubular portion 922 are integrally formed in one piece.

The bottom portion 99 is shaped into a substantially circular plate form. The bottom portion 99 is placed such that the bottom portion 99 closes an opening of the first tubular portion 921, which is located on the fuel rail side, and an opening of the second tubular portion 922, which is located on the pressurizing chamber side. The bottom portion 99 includes a recess 990 (serving as an urging-member receiving chamber) at a substantially center part of the bottom portion 99 on the pressurizing chamber side. The recess 990 is communicated with the flow passage 923 through a communication passage 993 (serving as a receiving-chamber communication passage) of the bottom portion 99.

A portion of the discharge valve spring 46 and a portion of the discharge valve member 55 are received in the recess 990. The other end of the discharge valve spring 46 contacts a discharge-valve-side bottom wall surface 991, which forms the recess 990. The other end of the relief valve spring 48 contacts a relief-valve-side bottom wall surface 992 of the bottom portion 99, which is located on the fuel rail side.

A peripheral wall 994 (serving as an inner wall of the valve housing, which forms the urging-member receiving chamber) of the recess 990 is slidable relative to a radially outer peripheral wall 553 of the slide portion 552 of the discharge valve member 55. In this way, the reciprocation of the discharge valve member 55 is guided.

The first tubular portion 921 is formed at the pressurizing chamber side of the first intermediate member 92. The first tubular portion 921 forms a space 924 (serving as a communication passage), which is configured to receive the discharge valve member 55, in cooperation with the bottom portion 99. The space 924 is communicated with the flow passage 923.

The second tubular portion 922 is formed at the fuel rail side of the first intermediate member 92. The second tubular portion 922 defines the relief chamber 920 in cooperation with the bottom portion 99 of the first intermediate member 92. The second tubular portion 922 includes communication passages 925, 926, which communicate between the relief chamber 920 and a radially outer side of the second tubular portion 922. The communication passage 926 is formed on the pressurizing chamber side of the communication passage 925. The communication passages 925, 926 are communicated with a gap 900 formed between the second tubular portion 922 and the inner wall of the large inner diameter portion 411. The gap 900 is communicated with the relief passage 414.

The first-communication-hole forming member 94 is shaped into a substantially ring form, and the first-communication-hole forming member 94 is placed on the pressurizing chamber side of the first intermediate member 92. An end surface 949 of the first-communication-hole forming member 94, which is located on the fuel rail side, contacts an end surface 928 of the first intermediate member 92, which is located on the pressurizing chamber side.

The first-communication-hole forming member 94 includes a first through hole 940 that extends through the first-communication-hole forming member 94 in the direction along the central axis CA41. The first through hole 940 is formed at a location that is different from a location along the central axis CA41. The first through hole 940 is configured to communicate between the discharge hole 142 and the space 924. A discharge valve seat 941 (serving as a first valve seat), against which the discharge valve member 45 is contactable, is formed around an opening of the first through hole 940, which is located on the fuel rail side.

In the sixth embodiment, the discharge valve body 41, the first-communication-hole forming member 94, the first intermediate member 92 (particularly, the first tubular portion 921 and the second tubular portion 922) and the second intermediate member 53 serve as a valve housing.

The fuel discharge relief device 80 of the sixth embodiment achieves the advantages (a), (c), (d) and (h) of the first embodiment.

The fuel discharge relief device 90 includes the single flow passage 923, which conduct the high pressure fuel. This makes it possible to reduce the processing costs as compared with a case of forming a plurality of flow passages.

OTHER EMBODIMENTS

In the above-described embodiments, the relief valve device is applied to the high-pressure pump that supplies the high pressure fuel to the internal combustion engine. However, the device, to which the relief valve device is applied, is not limited to such a high-pressure pump. It is only required that fluid of a first space, which has a relatively high pressure, is fed to a second space, which is a space different from the first space, according to a pressure of the fluid of the first space, so that the pressure of the fluid of the first space is reduced.

In the above-described embodiments, the discharge valve body, which is threadably fixed to the external structure, is formed separately from the relief-chamber forming member that is received in the discharge valve body and has the relief chamber that conducts the high pressure fuel. Alternatively, the discharge valve body and the relief-chamber forming member may be formed integrally into one piece.

In the above-described embodiments, the bottom portion includes the recess. Alternatively, the recess may be eliminated from the bottom portion.

In the above-described embodiments, the valve housing and the partition wall are formed integrally in one piece. Alternatively, the valve housing and the partition wall may be formed separately.

In the above-described embodiments, the relief-chamber forming member is made of the material that has the hardness higher than that of the discharge valve body. However, the relationship of the hardness of the material should not be limited to the above relationship.

In the above-described embodiments, the relief passage is communicated with the fuel gallery that serves as a communicating subject location. Alternatively, the communicating subject location of the relief passage may be appropriately changed as long as the communicating subject location of the relief passage is on the upstream side of the fuel suction device.

In the first, third and fifth embodiments, the discharge valve member is configured to reciprocate while the discharge valve member is sliding along the inner wall of the relief-chamber forming member. Alternatively, the discharge valve member may not slide along the inner wall of the relief-chamber forming member.

In the first, third and fifth embodiments, the communication passage, which communicates between the recess and the flow passage, may be provided like in the second, fourth and sixth embodiments.

In the first to fourth embodiments, the plurality of flow passages is arranged along the concentric circle that is centered at the point along the central axis. Locations of the plurality of flow passages are not limited to the above described locations.

In the first, third and fifth embodiments, the first relief chamber and the second relief chamber, which collectively serve as the relief chamber, are formed by the two hollow members, i.e., the first intermediate member and the second intermediate member. However, the number of the hollow members, which form the relief chamber, is not limited to two. For instance, the number of the hollow members, which form the relief chamber, may be three or more.

The liquid tightness of the relief chamber is maintained through the contact between the first end surface of the first intermediate member and the second end surface of the second intermediate member. Alternatively, the liquid tightness of the relief chamber may be maintained by a seal member that is separately provided and is placed between the first intermediate member and the second intermediate member.

In the second and sixth embodiments, the second intermediate member 53 is securely press fitted into the inside of the first intermediate member 52, 92. However, the fixing method of the second intermediate member 53 is not limited to this. For instance, screwing, welding, caulking or the like may be used.

In the fifth and sixth embodiments, the portion of the end surface of the discharge valve member, which is located on the fuel rail side, may be exposed to the flow passage like in the third and fourth embodiments.

The present disclosure is not limited to the above-described embodiments, and the present disclosure may be implemented in various forms within the scope of the present disclosure.

The present disclosure is discussed in view of the embodiments. However, the present disclosure is not limited to the above-described embodiments and the above-described structures. The present disclosure covers various modifications and equivalents thereof. Also, various combinations and forms, as well as other combinations and forms including one element only, one or more, or even less, among them, fall within the scope and spirit of the present disclosure.

What is claimed is:

1. A relief valve device that is configured to connect with a first pressure chamber and a second pressure chamber and is operable to reduce a pressure of fluid in the second pressure chamber, the relief valve device comprising:
   a valve housing that includes:
      a communication passage, which communicates between the first pressure chamber and the second pressure chamber; and
      a relief chamber, which is configured to communicate with the second pressure chamber;
   a partition wall that is formed in an inside of the valve housing and partitions between the communication passage and the relief chamber;
   a first valve member that is configured to block and enable flow of fluid between the first pressure chamber and the communication passage;
   a first urging member that has one end, which contacts the first valve member, and another end, which contacts the partition wall, wherein the first urging member urges the first valve member in an opposite direction that is opposite from the partition wall;
   a second valve member that is configured to block and enable flow of the fluid between the second pressure chamber and the relief chamber; and a second urging member that has one end, which contacts the second valve member, and another end, which contacts the partition wall, wherein the second urging member urges the second valve member in an opposite direction that is opposite from the partition wall.

2. The relief valve device according to claim 1, wherein the valve housing includes:
a casing that is shaped into a tubular form; and
a relief-chamber forming member that is received in the casing and includes the communication passage and the relief chamber.

3. The relief valve device according to claim 2, wherein:
the relief-chamber forming member includes:
a relief seat member that includes:
a relief through hole, which is configured to enable communication between the second pressure chamber and the relief chamber through the relief through hole, and
a relief valve seat that is formed around an opening of the relief through hole located on a side where the relief chamber is placed, wherein the relief seat member slidably supports the second valve member; and
a tubular member that is shaped into a hollow tubular form and is formed separately from the relief seat member, wherein the tubular member is configured to fix the relief seat member in an inside of the tubular member;
the relief seat member includes:
a relief valve seat portion that includes the relief through hole and the relief valve seat; and
an outside contact portion that has an outer wall surface, which is located at a radially outer side of the outside contact portion and is configured to contact the tubular member when the outside contact portion is fixed to the tubular member; and
an inside slide portion that has an inner wall surface, which is located at a radially inner side of the inside slide portion and is slidable relative to the second valve member; and
the relief valve seat portion, the outside contact portion and the inside slide portion are placed at different locations, respectively, in a direction, along which the second valve member is reciprocated.

4. The relief valve device according to claim 2, wherein the relief-chamber forming member includes at least two hollow members that are formed separately from each other and respectively have a space in an inside thereof.

5. The relief valve device according to claim 4, wherein:
the at least two hollow members include a first hollow member and a second hollow member; and
liquid-tightness of the relief chamber is maintained through contact between a first end surface of the first hollow member and a second end surface of the second hollow member.

6. The relief valve device according to claim 5, wherein a contact location, at which the first end surface and the second end surface contact with each other, is communicated with a fluid storage chamber that stores fluid to be supplied to the first pressure chamber.

7. The relief valve device according to claim 1, wherein an opposite end surface of the first valve member is exposed to the communication passage while the opposite end surface of the first valve member is opposite from a contact side of the first valve member that is configured to contact a first valve seat placed on the communication passage side of a first through hole that is configured to enable communication between the first pressure chamber and the communication passage through the first through hole.

8. The relief valve device according to claim 1, wherein the valve housing includes:
an urging-member receiving chamber that is configured to receive a portion of the first urging member; and
a receiving-chamber communication passage that communicates between the urging-member receiving chamber and the communication passage.

9. The relief valve device according to claim 8, wherein the first valve member is slidable relative to an inner wall of the valve housing that forms the urging-member receiving chamber.

10. The relief valve device according to claim 1, wherein:
the communication passage is one of a plurality of communication passages formed at the valve housing; and
the plurality of communication passages is placed on a radially outer side of the relief chamber and is arranged along a concentric circle that is centered at a point along a central axis of the valve housing.

11. The relief valve device according to claim 1, wherein the communication passage is placed on one side of the relief chamber in a radially outward direction.

12. A high-pressure pump comprising:
a pump housing that includes:
a pressurizing chamber that is configured to draw fuel as the fluid and pressurize the drawn fuel;
a suction passage that is configured to conduct the fuel to be drawn in the pressurizing chamber; and
a discharge passage that is configured to conduct the fuel that is pressurized in and is discharged from the pressurizing chamber;
a suction valve that is placed between the suction passage and the pressurizing chamber and is configured to adjust an amount of the fuel to be pressurized in the pressurizing chamber; and
the relief valve device of claim 1 while the relief valve device is placed between the pressurizing chamber and the discharge passage and is configured to discharge the fuel, which is pressurized in the pressurizing chamber, to a fuel rail, wherein:
the first pressure chamber is the discharge passage, and the second pressure chamber is the fuel rail.

13. The high-pressure pump according to claim 12, further comprising a fuel storage portion that is configured to store the fluid to be supplied to the suction valve, wherein the relief chamber is communicated with the fuel storage portion.

* * * * *